United States Patent [19]

Ketcham

[11] Patent Number: 4,871,489

[45] Date of Patent: Oct. 3, 1989

[54] SPHERICAL PARTICLES HAVING NARROW SIZE DISTRIBUTION MADE BY ULTRASONIC VIBRATION

[75] Inventor: Thomas D. Ketcham, Big Flats, N.Y.

[73] Assignee: Corning Incorporated, Corning, N.Y.

[21] Appl. No.: 185,298

[22] Filed: Apr. 19, 1988

Related U.S. Application Data

[63] Continuation of Ser. No. 916,285, Oct. 7, 1986, abandoned.

[51] Int. Cl.[4] ................................................ B29B 9/10

[52] U.S. Cl. .......................................... 264/9; 264/13; 425/6; 425/10; 502/9

[58] Field of Search ......................... 264/9, 10, 13, 12; 425/6, 7, 10; 502/8, 9

[56] References Cited

U.S. PATENT DOCUMENTS

| | | | |
|---|---|---|---|
| 1,951,790 | 3/1934 | Curran | 425/6 |
| 2,510,574 | 6/1950 | Greenhalgh | 425/6 |
| 2,968,833 | 1/1961 | DeHaven et al. | 264/9 |
| 3,060,510 | 10/1962 | Fischer et al. | 264/9 |
| 3,274,642 | 9/1966 | Cramer | 264/9 |
| 3,290,122 | 12/1966 | Clinton et al. | 264/9 |
| 3,352,950 | 11/1967 | Helton et al. | 264/10 |
| 3,790,079 | 2/1974 | Berglund et al. | 239/3 |
| 3,817,502 | 6/1974 | Taylor | 264/9 |
| 3,933,955 | 1/1976 | Lysher | 264/9 |
| 4,154,379 | 5/1979 | Schermutzki | 264/9 |
| 4,628,040 | 12/1986 | Green et al. | 502/9 |

FOREIGN PATENT DOCUMENTS 932246 8/1955 Fed. Rep. of Germany .......... 264/9

OTHER PUBLICATIONS

D. L. Chess et al., "Precursor Powders for Sulfide Ceramics Prepared by Evaporative Decomposition of Solutions", Communications of the American Ceramic Society, Nov. 1983.

James B. Angell et al., "Silicon Michromechanical Devices", Scientific American, vol. 248, No. 4, pp. 44–55, Apr. 1983.

Ernest Bassons, "Fabrication of Novel Three-Dimensional Microstructures by the Anisotropic Etching of (100) and (110) Silicon", IEEE Transactions on Electron Devices, vol. ED-25, No. 10, Oct. 1978.

Model 3450 Vibrating Orifice Aerosol Generator Instruction Manual, Revision B, TSI P/N 1933450.

*Primary Examiner*—Jan H. Silbaugh
*Assistant Examiner*—Mary Lynn Fertig
*Attorney, Agent, or Firm*—Gary H. Levin; Joseph F. Posillico; Richard N. Wardell

[57] ABSTRACT

An apparatus and process for producing liquid droplets having a narrow size distribution. Thin liquid streams are forced under pressure through a plurality of orifices in an orifice plate, the largest of which orifices has a diameter not greater than about three times the diameter of the smallest of those orifices. Also the thin liquid streams are vibrated to cause the breakup of each stream into droplets having a narrow size distribution.

29 Claims, 22 Drawing Sheets

SPHERICAL PARTICLES HAVING NARROW SIZE DISTRIBUTION MADE BY ULTRASONIC VIBRATION

This is a continuation of application Ser. No. 916,285 filed Oct. 7, 1986, now abandoned.

BACKGROUND OF THE INVENTION

This invention relates to the production of liquid droplets and solid particles having very narrow size distributions. More particularly, this invention relates to methods and apparatus for the production of metal oxide and metal oxide precursor particles having a generally spherical shape and very narrow size distribution.

The uses for metal oxide powders are numerous and varied, ranging from active ingredients in antiperspirants to ceramic raw materials. In the vast majority of these applications, the size distribution and shape of the particles which make up the powder are of critical importance. In the processing of ceramic articles, for example, dense particles having a generally spherical shape and narrow size distribution pack into a highly dense green body, which allows sintering at low temperatures and provides greater strength and density in the final ceramic body. In other applications, it is desirable to prepare multicomponent metal oxide particles which not only have the above characteristics, but also are chemically homogeneous. For example, particles of this type are advantageous in the production of structural ceramics, wear resistant ceramics, electronic dielectric materials, electronic substrate materials, phosphors, and potentially as precursors for optical waveguide preforms.

One known method for the synthesis of multicomponent metal oxide powders involves the evaporative decomposition of solutions. In the practice of this method, a dilute salt solution is atomized to form a spray of droplets, after which solvent is removed from the droplets by the application of heat to form dry particles of the solute. These dry particles are generally decomposable, through the further application of heat during calcining, to the metal oxide itself. Many other methods for producing metal oxide particles also require the production of a spray of droplets.

In most of these methods, the liquid droplet production is critical not only to the shape and characteristics of the final solid particles, but also to the yield of the particles from the process. One method which is typically used to produce a droplet spray is known as a "double fluid atomization". In this method, the liquid to be atomized is forced from a jet nozzle to form a thin liquid stream which is contacted by a second stream of high pressure gas resulting in a highly turbulent mixing and break up of the liquid stream into minute droplets. See for example the report by D. L. Chess, et al in the article "Precursor Powders for Sulfide Ceramics Prepared by Evaporative Decomposition of Solutions", Communications of the American Ceramic Society, November, 1983. One disadvantage of this method is that the liquid droplets which are produced have a very wide size distribution, which in turn results in particles having a very wide size distribution.

An alternative method is known as the vibrating orifice method or the Rayleigh instability method. This method generally produces droplets having a very narrow size distribution and is based upon the principle that a thin liquid stream emitted from a opening under pressure is by nature unstable and will soon disintegrate into droplets by any external forces acting thereupon. The collapse of such a stream into uniform droplets is attained by applying to the stream a periodic vibration of the appropriate amplitude and frequency. It should be noted that the term "vibrating orifice" is actually a misnomer since the orifice itself need not vibrate; disintegration of the liquid stream occurs in the same manner irrespective of where or how the oscillatory vibrations are imparted to the liquid. One characteristic of the vibrating orifice method is that the size distribution of the resulting droplets will depend mainly upon the diameter of the thin liquid stream, which itself depends on the orifice diameter, and the frequency of the vibrations. One prior art application of the Rayleigh instability technique has been to use long capillary tubes to produce the thin liquid streams required by that method. See for example U.S. Pat. No. 3,352,950—Helton et al. While the use of capillary tubes according to this technique may be advantageous for certain purposes, it is not practical for the production of micron size droplets on a commercial scale. For example, if the inner diameter of the capillary is greater than about 30 microns, then highly diluted solutions would be required to obtain solid particles having diameters below about 3 microns. As a result only a very small yield of solid particles would be obtained. On the other hand, if the inner diameter of the capillary is significantly less than about 20 microns, then the liquid pressure required to form a thin stream according to the Rayleigh instability method becomes extremely large. More specifically, a capillary tube having a length of approximately one centimeter and an inner diameter of approximately 5 microns would require a liquid pressure of over 100,000 psi to form a suitable liquid stream. Providing equipment to operate under such conditions is clearly undesirable.

In other applications a thin plate or foil having an orifice therein is used in place of the capillary tube to produce the thin liquid stream required by the Rayleigh instability method. Prior art apparatus and methods have generally been limited to the use of plates having a single orifice. Several advantages result from the use of the such single orifice nozzles. For example, the use of a single orifice eliminates one possible source of variation in droplet size and thus results in a more easily obtained uniform particle distribution. Another advantage is that the single orifice has a minimal impact on the mechanical stability of the orifice plate. On the other hand, however, the production rate of such single orifice generators is limited to the flow rate of the single liquid stream. Accordingly, many generators would be needed to produce large quantities of droplets. Due to the high capital cost associated with each generator, this is clearly not a desirable option. As a result, the prior art vibrating orifice methods have suffered the disadvantages of the single orifice generator in order to achieve uniform droplets. The present invention provides a method and apparatus having the advantages of the single orifice generator without its disadvantages.

SUMMARY OF THE INVENTION

It is an object of the present invention to provide an improved apparatus for the production of liquid droplets and/or solid particles derivable from said droplets, both having a narrow size distribution, at rates which are commercially feasible.

It is another object of the present invention to produce such droplets from a vibrating member having a plurality of uniformly-sized orifices therein.

It is a further object of the present invention to provide a process for producing metal oxide precursor particles having a narrow size distribution.

These and other objects of the present invention are satisfied by an improved apparatus for the production of droplets and particles of the kind having a containment means for containing a body of liquid under pressure, said containment means communicating with an orifice plate having an orifice therein, means for forcing liquid from said containment means through the orifice to produce a thin stream of liquid, and means for vibrating the liquid stream to cause a breakup of said stream into droplets having a narrow size distribution, wherein the improvement comprises providing a plurality of orifices in said plate wherein the diameter of the largest orifice is not greater than about three times the diameter of the smallest orifice.

The present invention also includes a process for the production of liquid droplets having a narrow size distribution comprising the steps of forming a plurality of thin liquid streams by forcing said liquid under pressure through a plurality of orifices in a plate, and vibrating said thin liquid streams to cause the breakup of said streams into liquid droplets having a narrow size distribution.

DETAILED DESCRIPTION OF THE PREFERRED EMBODIMENT

The Apparatus

Figure 1:
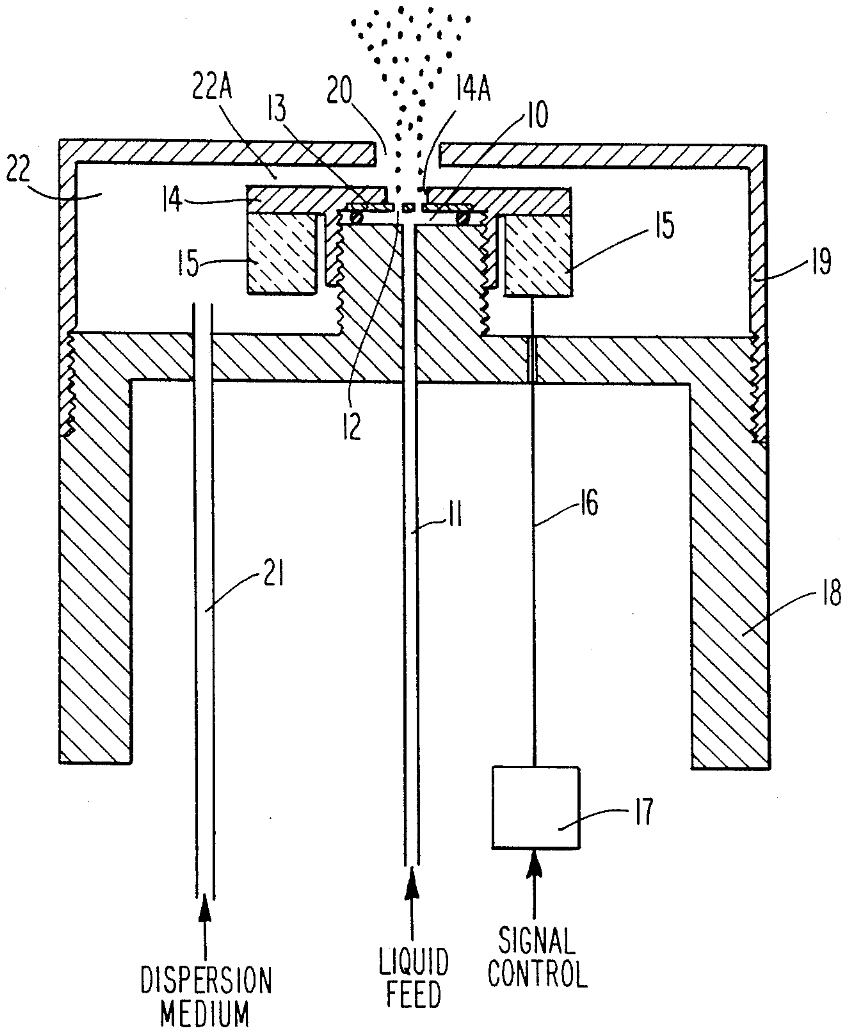
FIG. 1 is a schematic representation of a droplet generating apparatus according to the present invention.

According to the present invention, an aerosol liquid droplet generator of the kind shown in FIG. 1 provides a multi-orifice plate 13 in place of the heretofore used single orifice plate. With reference to the generator in general, FIG. 1 shows an apparatus comprising a chamber 10 for containing a body of liquid to be formed into droplets. Liquid feed tube 11 provides a source of pressurized liquid to chamber 10. The liquid feed passing through feed tube 11 may be pressurized by any means known in the art. It is preferred that the liquid feed pass through a filter (not shown) prior to entering feed tube 11. Orifice plate 13 is integrally connected to liquid orifice cup 14, which in turn is in operative engagement with a vibratory element 15, a piezoelectric ceramic for example. Electrical connector 16 connects vibratory element 15 to the control signal generator 17. Upon the appropriate electrical signal from generator 17 element 15 will begin to vibrate as is understood in the art. This vibration in turn causes a similar vibration in orifice cup 14 and hence in orifice plate 13. The orifice cup 14 is supported by base 18. Attached to base 18 is dispersion cover 19, which has a dispersion orifice 20. Orifice 20 is situated above the area of plate 13 containing the array of orifices 12, as shown, and is larger than that area. Cover 19 an base 18 define a chamber 22 surrounding element 15 and orifice cup 14. Dispersion medium is supplied under pressure to the chamber 22 through tube 21 as shown. A preferred aerosol droplet generator for use according to the present invention is aerosol generator model 3450 made by Thermo Systems, Incorporated (TSI), St. Paul, Mich., which, as explained more fully below, is adapted by replacing its single-orifice plate with a multi-orifice plate of the present invention. In operation, the droplet generator is normally situated in a manner such that dispersion orifice 20 discharges directly into the lower end of an upright drying column (not shown).

In operation, a liquid material is pumped under pressure by a syringe pump through a filter (not shown), into tube 11 and then into chamber 10. The liquid material is, for example, a solution or dispersion of a material, such as an oxygen-containing metal salt, that is decomposable to a refractory metal oxide. The drying column is generally maintained at a low pressure relative to chambers 10 and 22, and the liquid is ultimately ejected through orifice 20 into the drying column. The appropriate control signal from signal generator 17 passes through the electrical connector 16 to the vibratory element 15 which in turn provides a periodic vibration to orifice plate 13. This periodic vibration of orifice plate 13 causes the breakup of the liquid streams passing therethrough into small droplets having a narrow size distribution. The flow of an inert dispersion medium is supplied to chamber 22 through tube 21. The dispersion medium passes through the top space 22A of chamber 22 and contacts the droplet streams exiting through plate 13. This contact further disperses the liquid droplets and thereby tends to avoid impingement of one droplet upon another. The dispersion medium may be an inert gas, such as air or nitrogen, or a liquid in which the liquid of the droplets has limited solubility. The dispersed droplets then pass through the larger dispersion orifice 20 and out into the drying column. A dilution gas, such as air, is supplied to the drying column, by means not shown, and entrains the liquid droplets. The dilution gas dries the droplets and carries the resultant dried particles to a collection filter. In some applications, liquids may be used for dilution, and/or drying in place of gases.

The multi-hole orifice plates of the present invention are preferably made of stainless steel having a thickness of about 5-25 microns. A preferred thickness is about 10-15 microns. An important feature of the present invention resides is the use of orifice plates having thicknesses in the range disclosed herein. The thickness of the orifice plate used according to the present invention generally results in a relatively low liquid pressure requirement, 100 psi for example, while allowing a relatively high rate of liquid flow. This is advantageous since it results in a practical and inexpensive droplet generator which is readily adaptable for commercial use. Providing orifice plates having thicknesses according to the present invention also aids in the dispersion of the droplets and accordingly the attainment of a narrow size distribution therefore. In particular, when the pressurized liquid enters chamber 10 of the present invention, the orifice plate tends to deflect upward from the center. If the opening 14*a* which supports orifice plate 13 is generally circular, then the orifice plate develops a curvature approaching that of a section of a sphere. Since the orifices according to the present invention are generally formed normal to the plane of the orifice plate, curvature of the plate causes the fluid streams ejected from the orifices to diverge. This spreading of the fluid streams minimizes interaction of the streams and thus the impingement of the resultant droplets from one stream upon the droplets from another stream. This effect also allows closer spacing of the orifices than would otherwise be possible.

Several methods are available for producing multi-hole orifice plates according to the present invention. In each of the experiments described below, for example, the holes were produced by piercing the stainless steel plate at appropriate locations with a high intensity laser beam. The holes thus produced are slightly conical in shape, one side of the plate having an opening larger than the other side of the plate. In each of the experiments described below the orifice plates were oriented such that the larger openings of the holes faced the liquid feed chamber 10 of the apparatus in FIG. 1. However, the orientation of the orifice plate does not appear to have a substantial impact upon the results.

For the production of uniformly-sized droplets, it is preferred that an orifice plate be used in which the largest orifice has a diameter which is no more than about three times greater than the smallest orifice diameter. It is more preferred that the largest orifice have a diameter which is no greater than about one and one half times, and most preferably about one and one third times, the diameter of the smallest orifice. This can be attained readily by the laser production method described above. It is believed that other methods may be applicable for forming multi hole orifice plates according to the present invention, such as electro forming or silicon micro-machining. It should be noted that the laser technique described above results in orifices having a geometry through the thickness of the plate which is either a truncated cone or cylinder. However, a wider variety of orifice geometries can be produced using either silicon micromachining or electro forming. These techniques are explained in detail in the following papers, both of which are incorporated herein by reference: James B. Angell, et. al., "Silicon Micromechanical Devices", Scientific American, Vol. 248, No. 4, pages 44–55, April 1983; Ernest Bassons, "Fabrication of Novel Three-Dimensional Microstructures by the Anisotropic Etching of (100) and (110) Silicon", IEEE Transactions on Electron Devices, Vol. ED-25, No. 10, Oct. 1978. For example, the orifice geometry shown in FIG. 2 can be obtained using silicon micromachining techniques. As revealed by FIG. 2, it is preferred that one side of the plate has an opening 1 to 3 microns in diameter while the other side of the plate has an opening 5 to 10 microns in diameter. The small opening of the orifice may be in a layer having a thickness of only 1 to 5 microns whereas the larger opening of the orifice may be in a layer having a thickness of about 1 to 19 microns. In some applications it is preferred that the total plate thickness is between about 10 and 15 microns. Such geometries may eliminate the need for high fluid pressure (that is, pressures greater than about 1000 psi) even for orifices of diameters less than 1 to 2 microns. It will be appreciated by those skilled in the art that, in terms of stream and droplet size, the critical orifice diameter according to the present invention is the smallest diameter of the orifice. Applicant has found that the smaller diameter substantially controls the pressure necessary to obtain a fluid stream and the diameter of the stream. Accordingly, the orifice size variation requirements described above refer to this portion of the orifice.

Figure 3A:
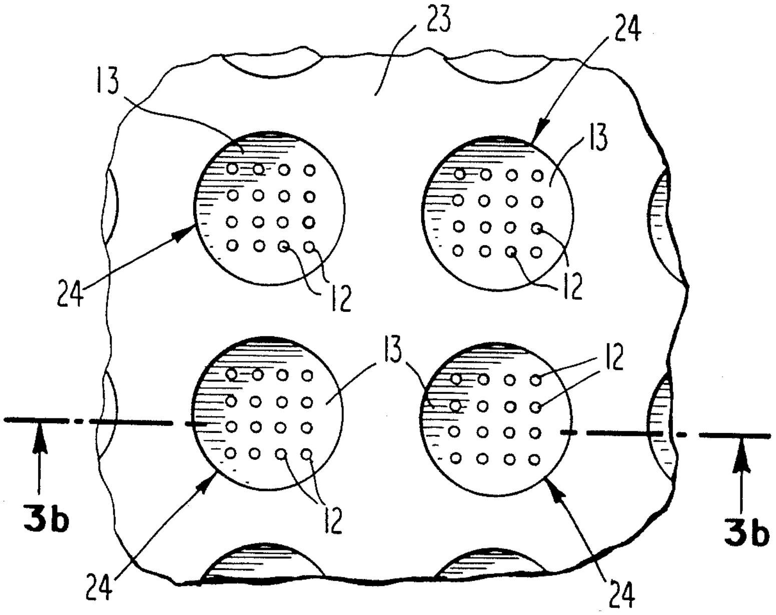
FIG. 3*a* is a top plan view of a multi hole orifice according to one embodiment of the invention.
Figure 3B:
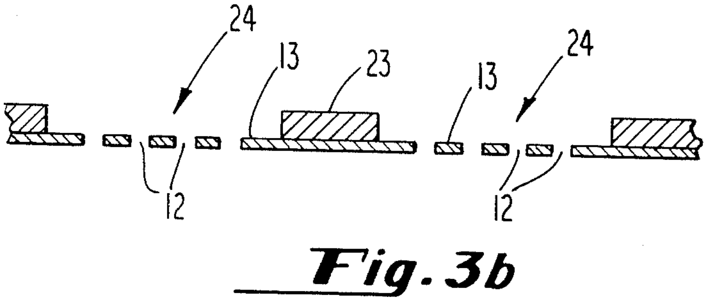
FIG. 3*b* is a cross sectional view of the multi hole orifice shown in FIG. 3*a* taken substantially along 3*b*—3*b*.

The relative location of the orifices on the orifice plate will depend on parameters such as the particular liquid precursor, the liquid pressure, the liquid flow rate, and others. All such variations are within the scope of the present invention. As disclosed in the examples below, applicant has produced multi-hole orifice plates having 4, 9, and 16 holes. In each of these cases, the holes are in a square grid configuration with approximately 100 microns between adjacent holes. It should also be noted that because stress is exerted upon the orifice plate by the pressurized liquid, the pattern of the orifices on the plate, the spacing between the orifices, and support for the plate are important design considerations, especially for plates having a very large number of orifices. For example, it may be possible to produce an orifice plate having about 1600 orifices. With such a large number of orifices, it is preferred to group the orifices in "cells" having about 16 or more orifices per cell. The orifices in each cell would be spaced in a square grid pattern with about 25 to 100 microns between adjacent orifices. Accordingly, the cells may be from 100 microns to about 2 millimeters in dimension. As mentioned above, it is preferred according to the present invention that the thickness of the orifice plate be minimized so that the pressure required to produce a thin liquid stream is also minimized. When such thin plates are used, especially plates having about 1600 orifices, it is preferable to provide additional support for the orifice plate. Referring to FIGS. 3*a* and 3*b*, for example, an orifice plate 13 having a plurality of orifices 12 therein is disclosed. The orifice plate is supported by a support member 23. Support member 23 contains a plurality of circular cutouts 24 arranged to coincide with the orifice cells 25. Support plate 23 is mounted or otherwise attached to orifice cup 14 so as to provide mechanical support and stability when the orifice plate is subject to the pressure of the liquid feed. When the silicon micromachining process described above is used, an orifice plate having a large number of orifices thereon will generally take the shape disclosed in FIGS. 4*a* and 4*b*. This figure reveals a plurality of linear "cells" 26 located in a thin silicon membrane at the bottom of a "V" trench 27 made by silicon micromachining technology. In this configuration, it is anticipated that the silicon nozzle will be supported by beams 28 of a relatively high strength material running perpendicular to the linear arrays of orifices.

Figure 4A:
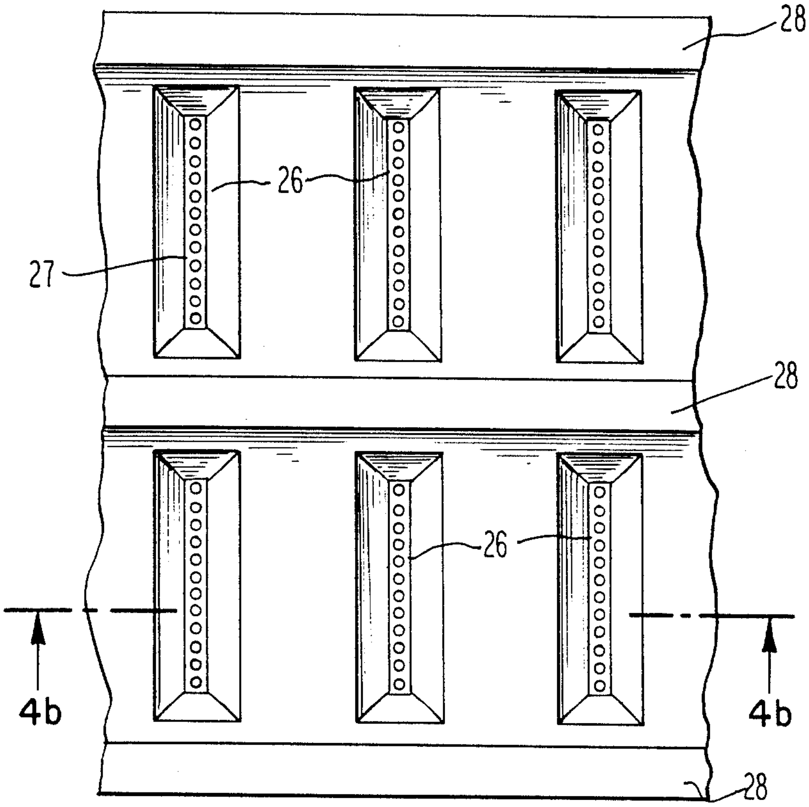
FIG. 4*a* is a multi hole orifice plate made according to another embodiment of the present invention.
Figure 4B:
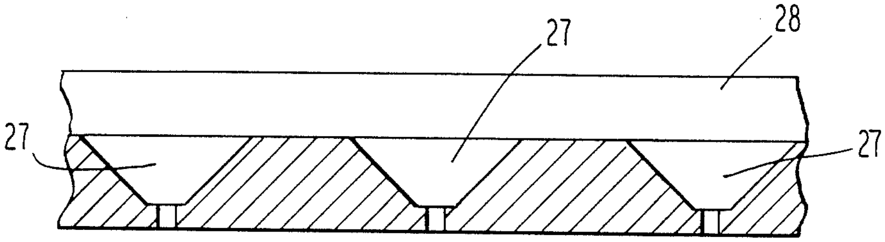
FIG. 4*b* is a cross sectional view of the orifice plate shown in FIG. 4*a* taken substantially along 4*b*—4*b*.

If multi orifice nozzles having an arrangement of cells as shown in FIGS. 3*a* or 4*a* is used, applicant believes that it may be preferable in some applications to locate a separate dispersion orifice above each "cell" in the array. This dispersion orifice will be typically 0.2 to 2 millimeters from the nozzle. The dispersion orifices would generally have a diameter of about 0.5 to 4 millimeters when the arrangement as shown in FIG. 3*a* is used. When the arrangement shown in FIG. 4*a* is used, the dispersion orifice would be rectangular in shape and have a width of less than about 0.4 millimeters and a length of about 2 millimeters. Other possibilities for the dispersion orifices also exist. For example, it may be possible to provide a separate dispersion orifice for each liquid stream produced.

The Method

As will be seen in the examples which follow, the method of the present invention often produces a collection of droplets and/or solid particles comprised of several groups of droplets and/or solid particles. Each group consists of particles which can be characterized as having essentially the same diameter. For the purposes of definition, particles in the group having the largest number of particles will generally be referred to as having the same "fundamental" or "base" diameter. It has been found that the particle group having the second largest population contains particles having a diameter which is about 1.26, i.e. the cube root of two, times the base particle diameter. Other particle groups are also generally found at about 1.59, i.e. the cube root of 4, at about 1.82, i.e. the cube root of six, and at about 2, i.e. the cube root of eight, times the base diameter. While applicant does not intend to be bound by or to any particular theory, these groupings appear to be produced by the impingement of droplets of the base diameter, i.e., the most common diameter, upon each other before they dry and gel. As used herein, a collection of droplets or particles has a narrow size distribution if more than about 50% of the mass of the collection of particles consists of particles having a diameter between about 70–150% of the base particle diameter. A collection of droplets or particles is also considered to have a narrow size distribution if more than about 80% of the mass of the collection consists of particles that have a diameter between about 70–250% of the base particle diameter.

The method of the present invention is an improvement in the production of liquid droplets by the Rayleigh instability technique. As described briefly above, the method is based upon imparting periodic vibrations to a thin liquid stream which is inherently unstable. An inherently unstable stream can be formed by forcing a liquid through a small orifice. This stream or column of liquid is then collapsed or broken-up into droplets having a very narrow size distribution by the application of periodic vibrations of suitable frequency. As is understood in the art, uniform droplets will be formed when the frequency of the applied vibration is below a certain maximum, as calculated according to the following formula:

$$f\max = \frac{4Q}{\pi^2 Dg^3}$$

where fmax is maximum frequency for producing uniform droplets.

Q is the flow rate of the liquid emitted from the orifice.

Dg is the diameter of the liquid stream, which is often approximated by the diameter of the orifice.

The method of the present invention improves upon the heretofore known Rayleigh instability method. The steps of the present invention include providing an orifice plate having a plurality of orifices therein, the diameter of the largest of said orifices being no greater than about three times the diameter of the smallest orifice, forcing pressurized liquid through said orifices in said plate so as to produce a plurality of liquid streams, and causing periodic vibration of each of said liquid streams so as to cause the breakup of said liquid streams into droplets having a generally spherical shape and a narrow size distribution. According to a preferred embodiment of the present invention, the step of causing periodic vibrations comprises imparting periodic vibrations to said orifice plate.

As mentioned briefly above, the impingement of droplets upon one another tends to widen the size distribution of the resultant particles. It has been found that this effect may be minimized by the application of an electrical charge to the droplets as they are formed. Charging the droplets in this manner tends to cause the streams to deflect away from one another. In addition, the droplet streams tend to break up into individual droplets much closer to the orifice plate than when the droplets are not charged. Droplets thus produced have been visually observed by light scattering to be more uniform in size and shape than those otherwise produced.

According to a preferred embodiment of the present invention, the liquid which is used to form the liquid droplets is a metal oxide precursor. As the term is used herein, a metal oxide precursor is a liquid-based solution, dispersion, suspension, etc., of an active ingredient dispersed or dissolved in a liquid carrier medium. As the term is used herein, an active ingredient is the metal oxide to be produced or any material which is readily convertible to the metal oxide. For example oxygen-containing salts of various metals are convertible to the metal oxides themselves upon the application of heat. In general, the carrier medium will be relatively inert and will provide a fluid medium for the active ingredient of the precursor. In addition, the carrier medium is generally more volatile than the active ingredient of the precursor. For example, a colloidal dispersion of zirconium hydroxynitrate in water constitutes a zirconium oxide precursor; zirconium hydroxynitrate is readily converted by heat into zirconium oxide, and water, as a carrier medium, is relatively inert and volatile with respect to the zirconium hydroxynitrate. In many applications of the present invention, it is preferred that the metal oxide precursor is any solution, dispersion, or suspension capable of forming a gel phase. It is known that some materials undergo a transition from a solution or a stable suspension or dispersion to what is known as a "gel phase". While the formation and nature of this gel phase is not thoroughly understood, for the purposes of the present invention it is sufficient to note that the transition into the gel phase is generally associated with a rapid increase in the viscosity of the material. The point at which this rapid increase occurs is generally designated as the "gel point". Methods are known in the art for determining the existence of the gel point and, therefore, the presence of a gel phase. It is believed that according to the methods of the present invention liquid droplets which pass through a gel phase upon removal or substantial removal of the liquid carrier medium tend to form spherically perfect particles having a narrow size distribution when the liquid carrier medium is removed from the droplet.

Another aspect of the method of the present invention comprises further processing the liquid droplets so as to convert the droplets to dry solid particles having a narrow size distribution. According to one embodiment, this further processing comprises entraining said droplets in an inert dilution gas, which provides a drying medium for removal of the liquid carrier medium by evaporation. In order to effect efficient removal of the liquid carrier medium, the dilution gas should be sufficiently below its saturation point with respect to its initial content of liquid carrier medium and should be supplied at a rate sufficiently high to cause evaporation of the liquid carrier medium into the dilution gas. For example, when the carrier medium is water and the dilution gas is air, the relative humidity of the air should be low. According to other embodiments of the present invention, the liquid droplets may be further processed by steps such as cooling, freezing, heating, chemical reaction, and the like.

It is preferred that the dry solid particles of the present invention, especially metal oxide precursor particles, have a number mean size of less than about 5 microns, and more preferably less than about 2 microns. It has been found that many parameters influence the number mean size of the dry particles, such as liquid precursor concentration, the extent of droplet dispersion, orifice diameters, and others. Accordingly, in some applications the mean orifice diameter according to the present invention will preferably be greater than about 0.5 microns and less than about 20 microns, more preferably between about 1 micron and 10 microns, and even more preferably between about 2 microns and 5 microns. While large orifice diameters (i.e.; about 10 microns or larger) tend to facilitate operation of the droplet generator by, for example, decreasing the liquid pressure required, they also tend to produce large droplets and particles. On the other hand, while small orifice diameters tend to produce small droplets they also tend to create operating difficulties. Accordingly, the mean orifice size which is preferred will depend upon each particular application.

In order to more fully illustrate the methods of the present invention, the following non-limiting examples are supplied. While the following examples are based upon experiments conducted with the apparatus described above and modifications thereof, those skilled in the art will appreciate that the method of the present invention is readily adaptable for use with many other apparatus.

EXAMPLE 1

This example is based upon an experiment conducted with a model 3450 generator from TSI except that the single-hole orifice plate was removed and replaced by one having four holes. The orifice plate was made from stainless steel having a thickness of about ½ mils or 12.5 microns. The nominal hole size was five microns, the largest diameter being approximately five microns and the smallest diameter being approximately four microns. The holes were arranged in a square configuration on the plate with about 100 microns between adjacent holes. The dispersion orifice, as supplied by the manufacturer, was approximately 0.7 mm in diameter.

A liquid metal oxide precursor was supplied to the chamber at approximately 160 psi. The liquid was comprised of a zirconium hydroxynitrate sol diluted in pH-adjusted distilled water in a sol:water volume ratio of 1:100. The zirconium hydroxynitrate sol was made up of the equivalent of 16 weight percent zirconium oxide. The pH adjusted water was distilled water to which nitric acid was added so as to bring the pH of the water down to the pH of the undiluted sol.

Figure 5A:
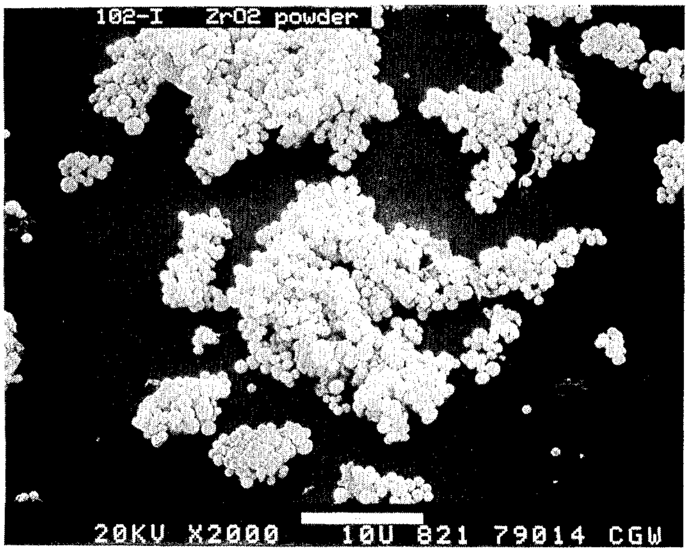
FIGS. 5-17 are scanning electron micrographs (SEM), optical microscope micrographs, and histograms of the particles described in Examples 1 through 19.
Figure 5B:
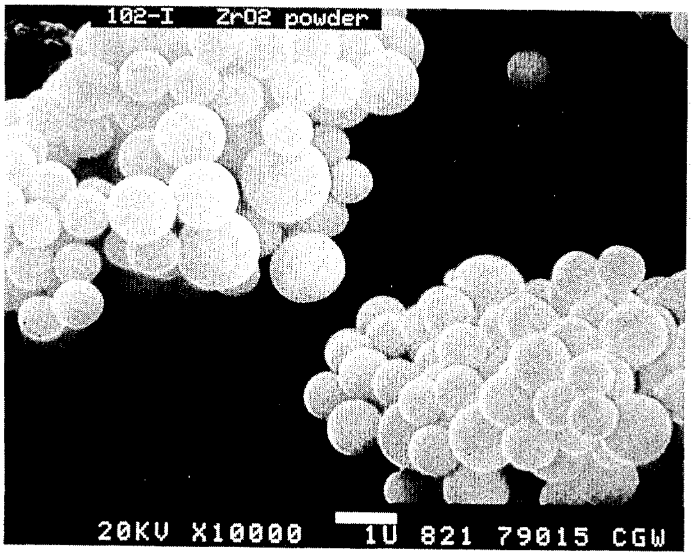
Figure 5C:
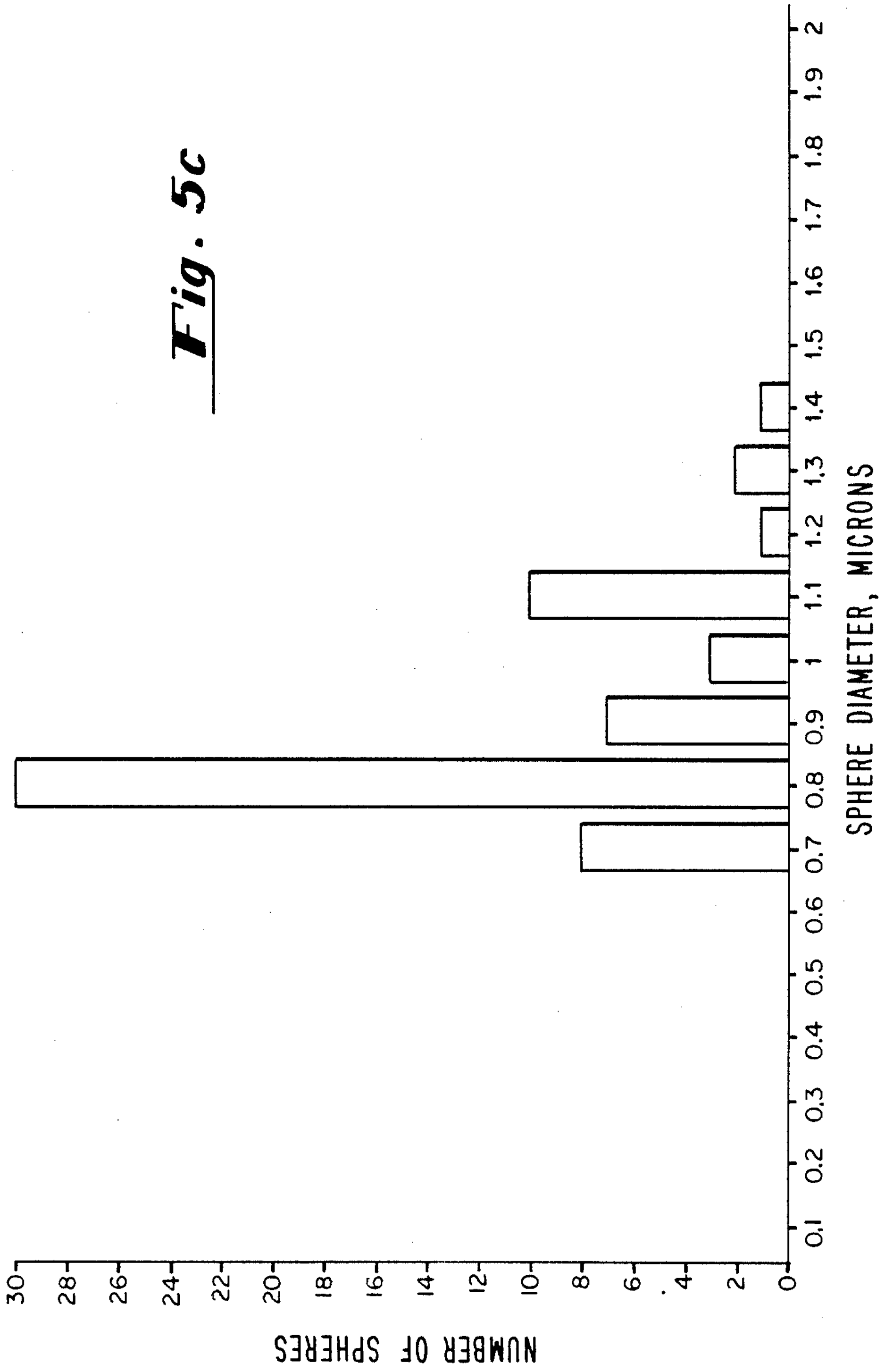
Figure 5D:
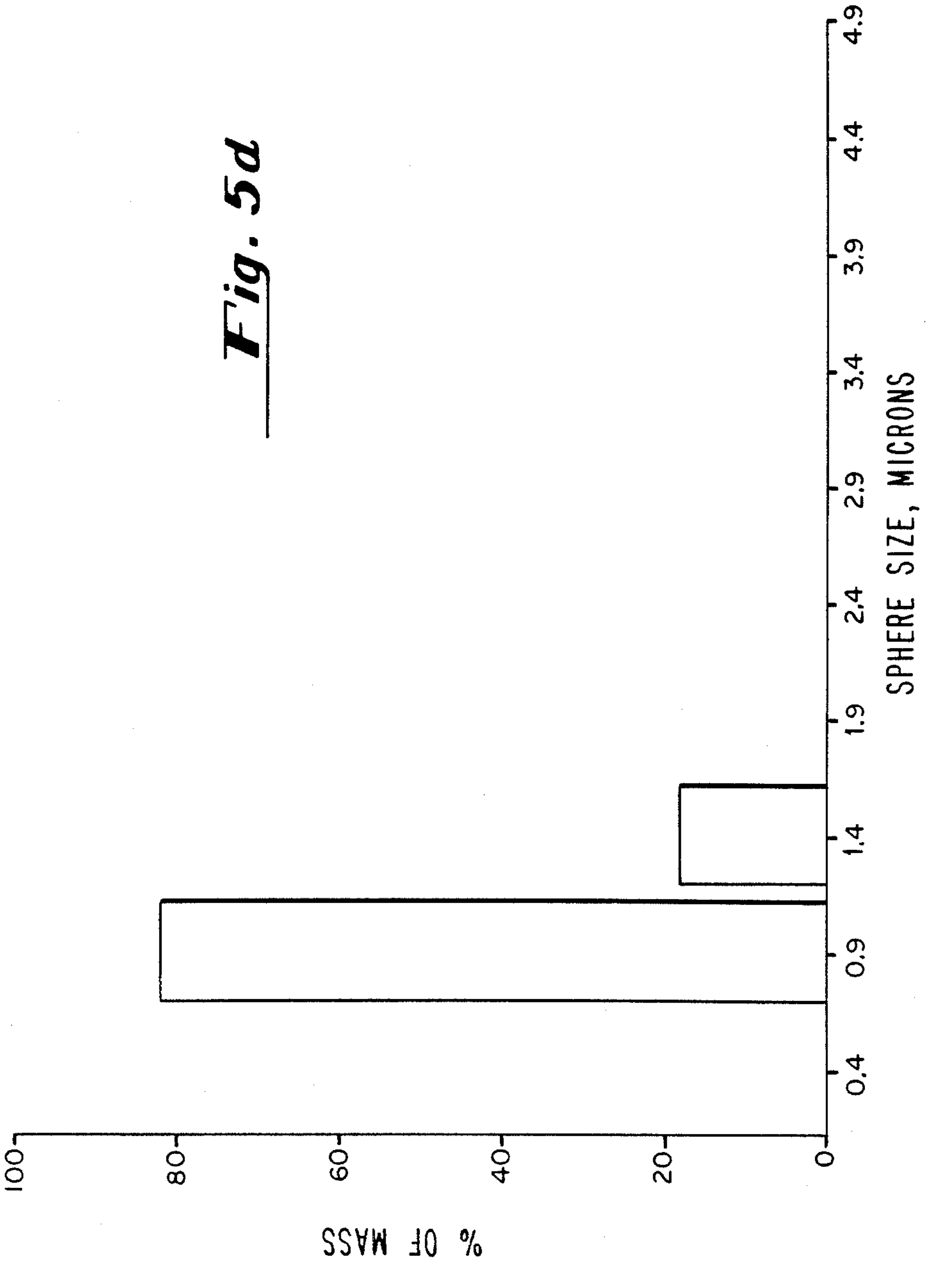

The frequency of vibration of the orifice plate was set by the control signal to 768 KHz. With the syringe pump set at $1\times10^{31\,3}$ cm/sec and using a 10 mL syringe having an inside diameter of 1.35 cm, at least three liquid streams were produced. Dispersion gas was supplied to the apparatus at a pressure of about 15–18 psi and a rate of about 2.5 L/min. Dilution air was supplied at a pressure of about 15–18 psi and at a rate of about 15 L/min. The droplets thus generated were passed through the drying column and collected on a filter as dry zirconium hydroxynitrate particles. The particles were then calcined at 600° C. The dry and calcined particles were of a generally spherical shape and had a narrow size distribution as shown by the SEM in FIGS. 5*a* and 5*b*, and the histogram in FIG. 5*c*. The size distribution was measured by an automated length measurement system having a manually positioned cursor. According to FIG. 5*c*, the collection of particles has size distribution peaks at about 0.85 micron diameter, at about 1.1 micron diameter, i.e. 0.85 times 1.26, and at about 1.3 micron, i.e. 0.85 times about 1.59. This data suggests that the larger particles are formed by the impingement of droplets upon one another before they dry. A plot of the percent of mass for the particles is given in FIG. 5*d*. In this figure, the mid point and size range for the bars in the graph are adjusted to include the most common or base particle diameter and the particle diameters within about plus 35% and minus 25% of the base particle diameter. It is apparent from FIGS. 5*a*–5*d* that the particles produced according to the procedure of example 1 have a narrow size distribution.

Except as otherwise noted, the measurement techniques and the histogram plotting techniques described above were also used to evaluate the particles produced according to the examples which follow.

EXAMPLE 2

Figure 6A:
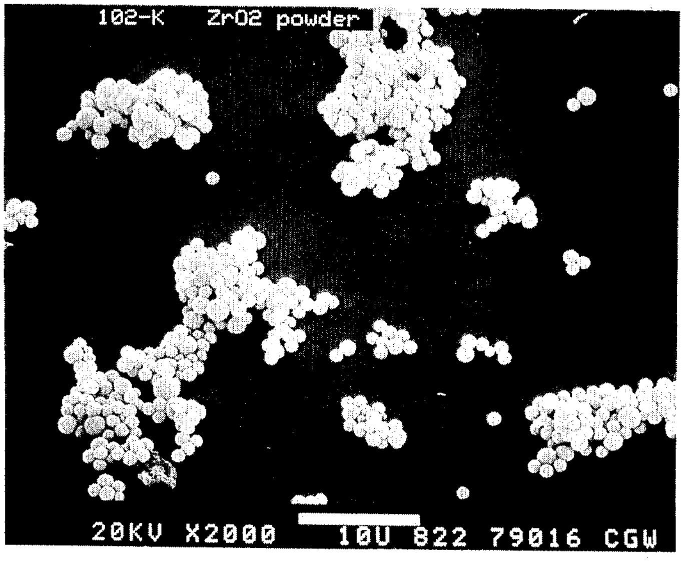
Figure 6B:
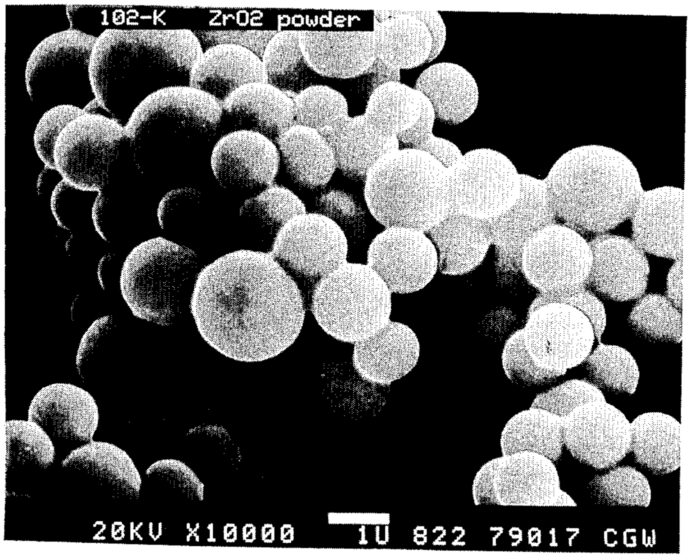

The process of Example 1 was repeated except that the orifice plate was vibrated at a frequency of 330 KHz. The resulting calcined particles were of a generally spherical shape and had a narrow size distribution as shown by the SEM in FIGS. 6*a* and 6*b*. It should be noted that at least three liquid streams were produced by the apparatus in this experiment and that four groups of particle size resulted.

EXAMPLE 3

Figure 7A:
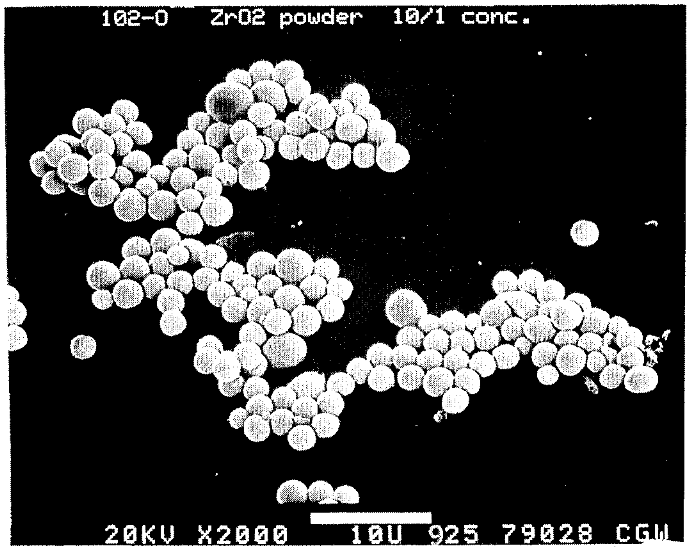
Figure 7B:
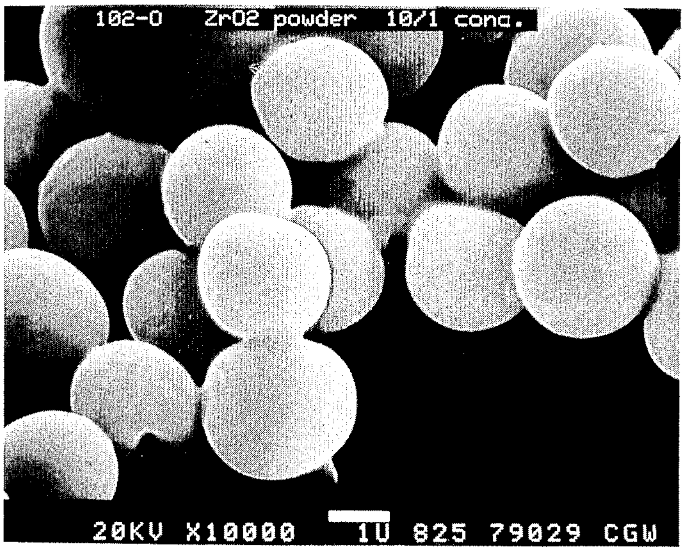

The process of Example 1 was repeated except that the zirconium hydroxynitrate sol:water volume ratio was 1:10 and the frequency of the orifice plate was reduced to 326 KHz. As seen by the micrograph in FIGS. 7*a* and 7*b*, while the particles can be classified as generally spherical, they were not as perfectly spherical as the particles produced by Examples 1 and 2 above.

EXAMPLE 4

Figure 8A:
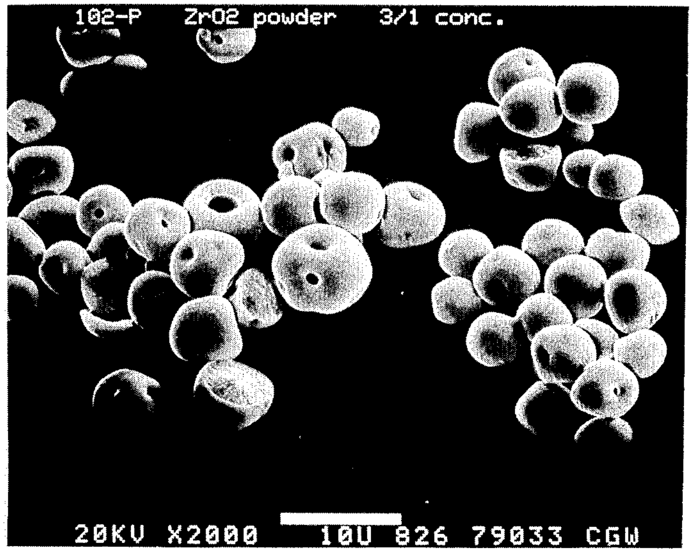
Figure 8B:
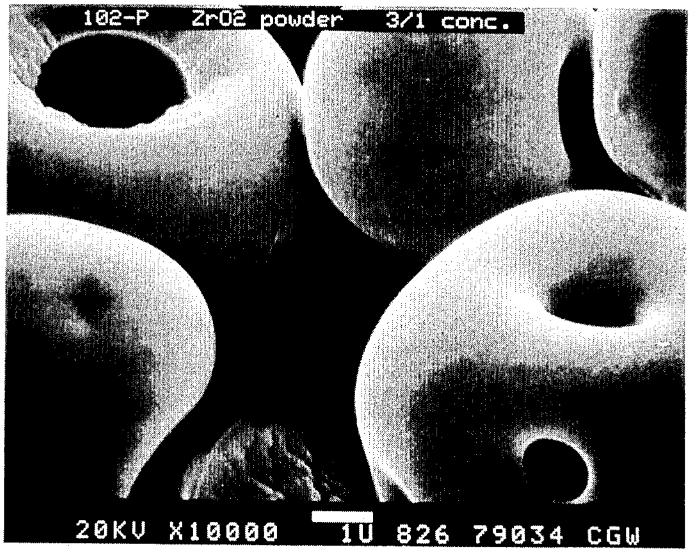

The procedure of Example 3 was repeated except that the zirconium hydroxynitrate sol:water volume ratio was 1:3. As can be seen from the micrographs of FIGS. 8*a* and 8*b*, some of the resultant dry particles were non spherical and contained dimples and irregularities. Note, however, that even at these high concentrations of sol to water there is generally no more than four distinct groups of particle sizes produced from the four hole nozzle. While applicant does not wish to be bound by or to any theory, it is believed that the addition of nitric acid to the water used for dilution causes the sol to become less stable during drying and to thus gel more rapidly. This rapid gelling of the droplets is believed to cause the hollow particles.

EXAMPLE 5

This example is based upon an experiment conducted with an orifice plate made of ½ mils thick stainless steel having four holes with a nominal diameter of approximately 10 microns. The largest diameter is approximately 10 microns and the smallest diameter is approximately 7.5 microns. The holes were arranged in a square grid configuration on the plate with about 100 microns between the adjacent holes. The dispersion orifice, as supplied by the manufacture, was approximately 0.7 millimeters in diameter.

An aluminum chlorohydrate sol was diluted in distilled water in a sol: water volume ratio of 1:10. A sol of zirconium hydroxynitrate was diluted with distilled water in a sol: water volume ratio of 1:4. The dilute aluminum chlorohydrate sol and the dilute zirconium hydroxynitrate sol were then mixed in a 1 to 1 volume ratio to form a liquid metal oxide precursor.

The liquid metal oxide precursor was then supplied to the chamber at approximately 36 psi. The frequency of vibration of the orifice plate set to 84.3 kilohertz. The dispersion air flow was about 2.2 liters per minute and supplied at about 15 to 18 psi. Dilution air was supplied at a rate of 30 liters per minute when using a pressure of 15 to 18 psi. Using a 10 milliliter syringe having an internal diameter of 1.35 cm and the syringe pump setting of $2.9\times10^{-3}$ centimeters per second, narrow size distribution particles having a generally spherical shape were produced. These particles are a precursor for the well known ceramic compound alumina zirconia.

EXAMPLE 6

This example is based upon an experiment conducted with an orifice plate made of ½ mils thick stainless steel having nine holes with a nominal diameter of approximately 7.5 microns. The largest diameter was approximately 8 microns and the smallest diameter was approximately 7.5 microns. The holes were arranged in a square grid configuration on the plate with about 100 microns between the adjacent holes. The dispersion orifice, as supplied by the manufacturer, was approximately 0.7 millimeters in diameter.

The zirconium hydroxynitrate sol precursor of Example 1 was supplied to the chamber at between about 120 and 160 psi. The orifice plate was set by the control signal to vibrate at a frequency of 645.6 KHz. The speed of the pump ranged between about $5.3\times10^{-3}$ and $5.6\times10^{-3}$ centimeters per second and a 10 mL syringe having an internal diameter of 1.35 cm was used. Dispersion gas was supplied to the apparatus at a pressure of about 15–18 psi at a rate of about 3.5 liters per minute. Dilution air was supplied at a pressure of about 15–18 psi and at a rate of about 20 liters per minute. The droplets thus generated were passed through a drying column and collected in the form of a wet gel on the filter paper. It is believed that insufficient diluting air was provided in this example to completely dry the liquid precursor droplets and produce dry solid particles.

EXAMPLE 7

Figure 9A:
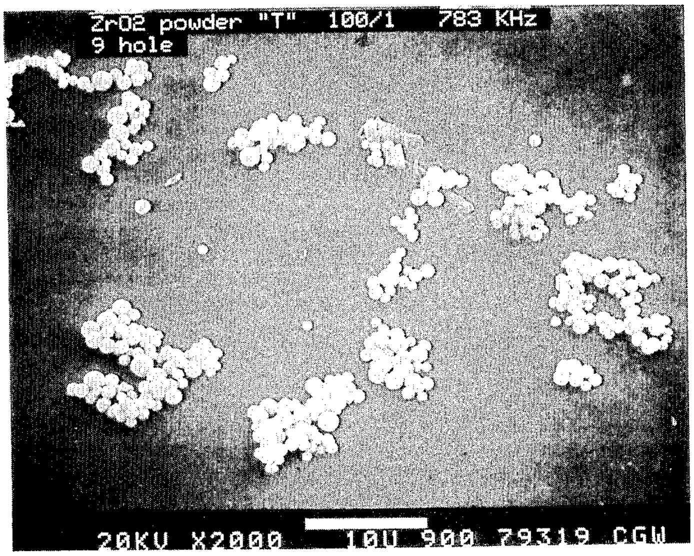
Figure 9B:
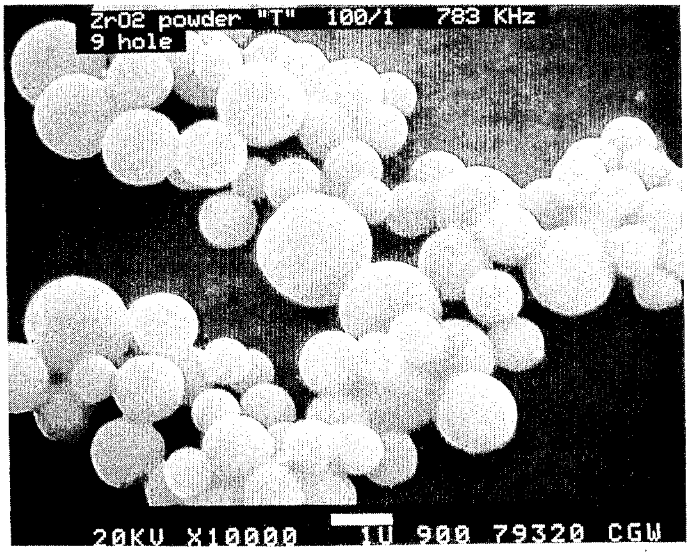

The procedure of Example 6 was repeated except that 40 liters per minute of diluting air was supplied to the apparatus and the orifice plate was oscillated at a frequency of about 783 KHz. As revealed by the SEM in FIGS. 9*a* and 9*b*, the dried zirconium hydroxynitrate particles were of a generally spherical shape and had a narrow particle size distribution. It should be noted that between about 5 and 6 groups of particle sizes were present.

EXAMPLE 8

Figure 10A:
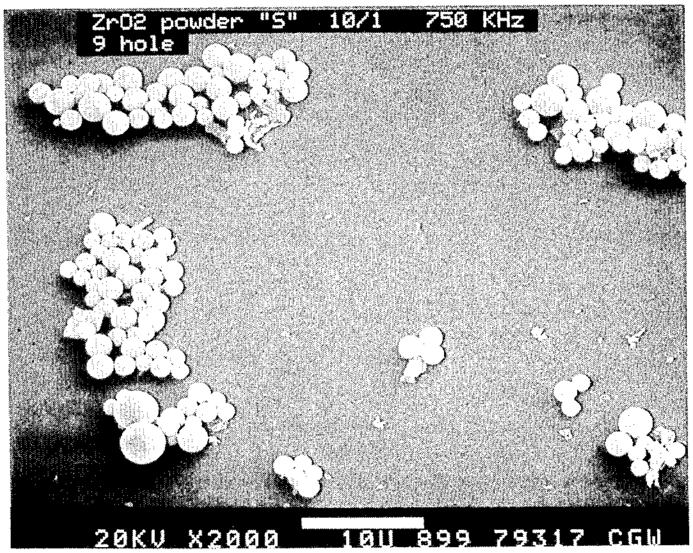

The procedure of Example 7 was repeated except that the zirconium hydroxynitrate sol:water volume ratio was 1:10 and the orifice plate was vibrated at a frequency of 750 KHz. As revealed by the SEM in FIGS. 10*a* and 10*b*, spherical particles having a narrow size distribution were produced, with less than about 5 to 6 groups of particle sizes present.

Figure 10B:
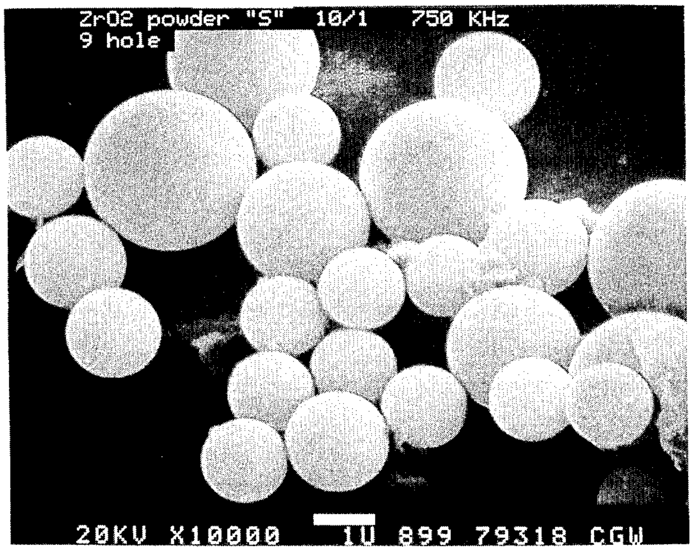
Figure 10C:
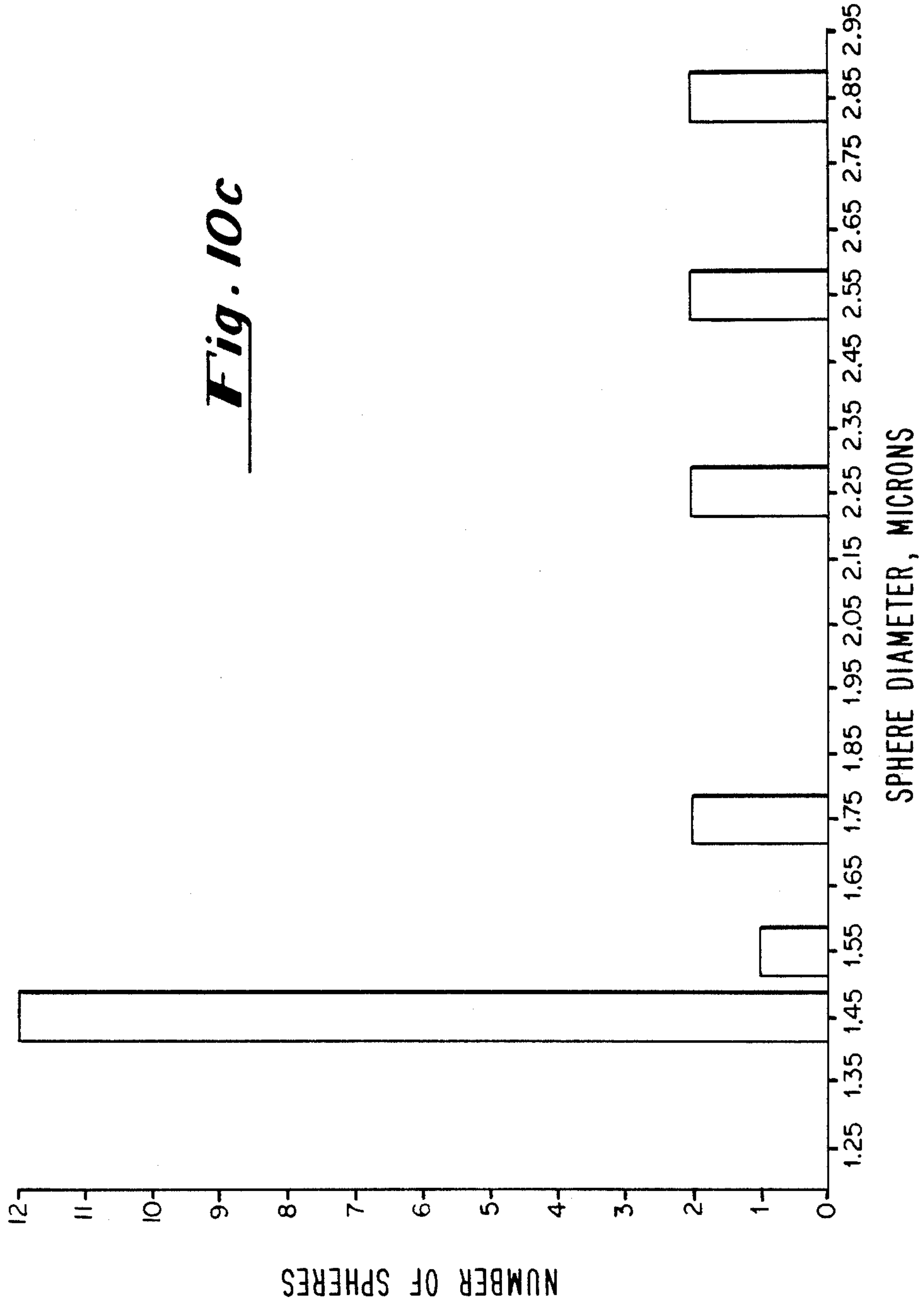
Figure 10D:
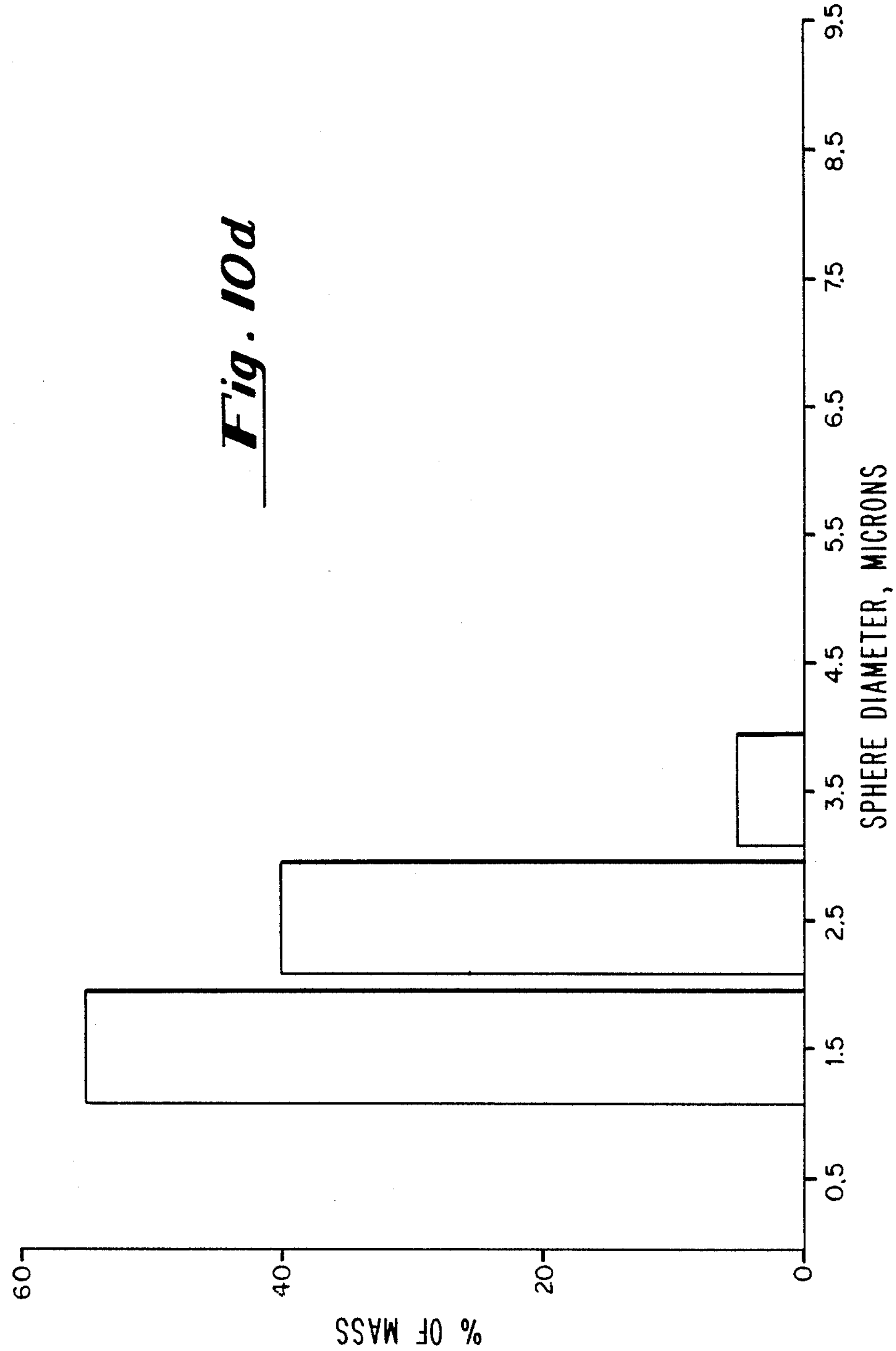

FIG. 10*c* reveals a histogram of the size distribution of the spherical particles shown in FIG. 10*b*. The histogram of FIG. 10*c* reveals that the base particle diameter is about 1.4 microns and that the other groups of particles have diameters corresponding to about 1.26, 1.59, 1.82 and 2 times 1.4 microns. This data clearly suggests that the larger particles are a result of droplet impingement. A percentage mass histogram of the particles is shown in FIG. 10*d*. This histogram clearly indicates that the resultant dry particles had a narrow size distribution.

EXAMPLE 9

Figure 11A:
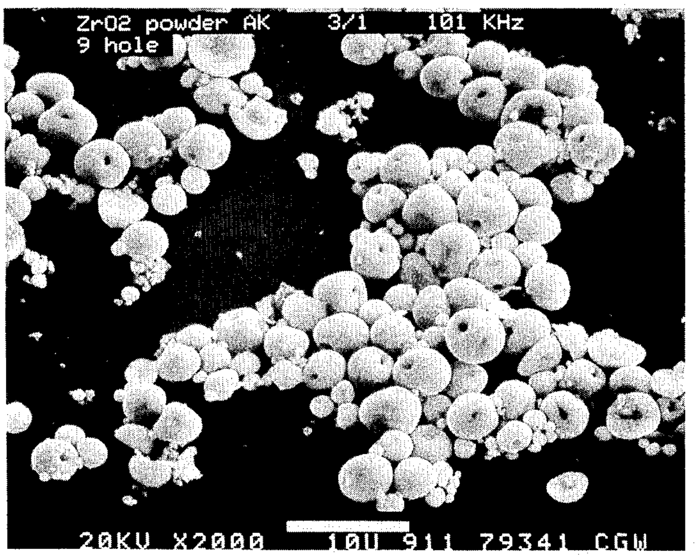
Figure 11B:
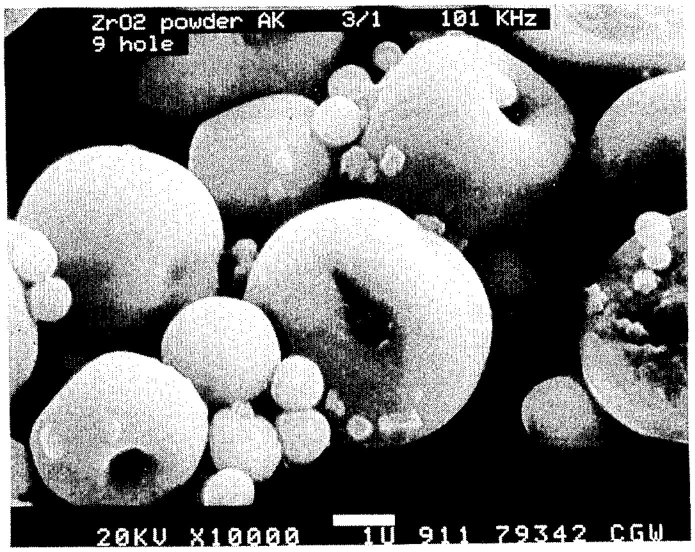

The procedure of Example 6 was repeated except that the zirconium hydroxynitrate sol:water volume ratio was 1:3 and the orifice plate was vibrated at a frequency of 101 KHz. As can be seen by the SEM in FIGS. 11*a* and 11*b*, the resulting dry particles had dimpled surfaces and a wide size distribution.

EXAMPLE 10

Figure 12A:
Figure 12B:
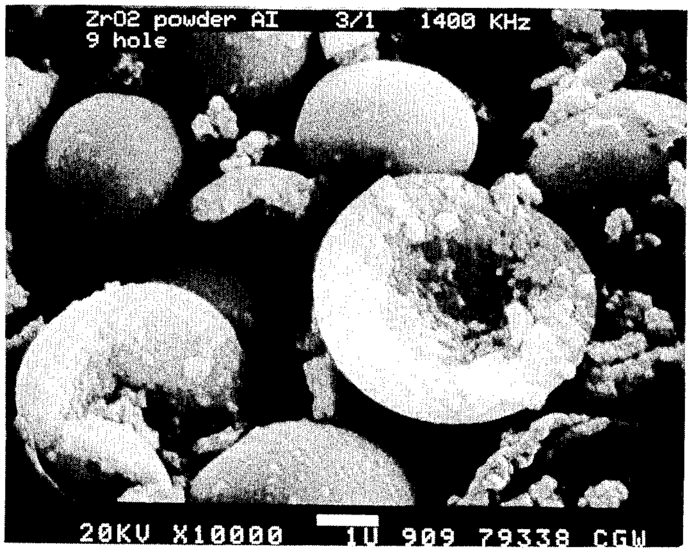

The procedure of Example 9 was repeated except that the orifice plate was vibrated at a frequency of 1400 KHz. As revealed in the SEM of FIGS. 12*a* and 12*b*, the resulting dry particles appear to be hollow and have a large size distribution.

Although the processes of Examples 9 and 10 produce dry particles having a wide size distribution, it is believed that the droplets as produced were of a generally spherical shape with a narrow size distribution. It should be noted that in both of these examples the dilution air flow rate was only 20 liters per minute. A dilution air flow rate of this magnitude is probably insufficient to completely dry the droplets when the liquid flow rate is in the range described above. It is believed that this insufficiency of dilution air and the addition nitric acid in the pH adjusted dilution water is the cause of the dimpled and hollow particles having a wide size distribution.

EXAMPLE 11

The procedure of Example 6 was repeated except that less than about 2.5 liters per minute of dispersion air were supplied to the apparatus. This rate of dispersion air, when used in conjunction with the conditions described above, resulted in substantial impingement of the droplets upon the inside dispersion orifice cover.

EXAMPLE 12

This example is based upon an experiment conducted with a model 3450 generator from TSI except that: (1) the single hole orifice plate was removed and replaced by a 16 hole orifice plate made of ½ mils thick stainless steel, and (2) the dispersion cover having a 0.7 millimeter dispersion orifice was replaced with a cover having a 2.0 millimeter orifice. Nominal hole size for the orifice plate was 7 microns, the largest diameter being approximately 7 microns and the smallest diameter being approximately 6 microns. The holes were arranged in a square grid configuration on the plate with 100 microns between adjacent holes.

A liquid precursor was supplied to the chamber at approximately 80 to 90 psi. The precursor liquid was comprised of a zirconium acetate sol diluted in distilled water in a volume ratio of 1 to 1. The zirconium acetate sol was made of the equivalent of 20 weight percent zirconium oxide dispersed in water. The dilution water used was not pH adjusted as in the previous experiments.

The orifice plate was vibrated at a frequency of 331 kilohertz. Syringe pump speed was approximately 6.5 to $7.5\times10^{-3}$ centimeters per second using a 10 mL syringe having an internal diameter of 1.35 cm. Dispersion gas was supplied to the apparatus at a pressure of about 15 to 18 psi and at a rate of about 2.5 liters per minute. Dilution air was supplied to the apparatus at a pressure of about 15 to 18 psi and at a rate of about 50 liters per minute.

Figure 13A:
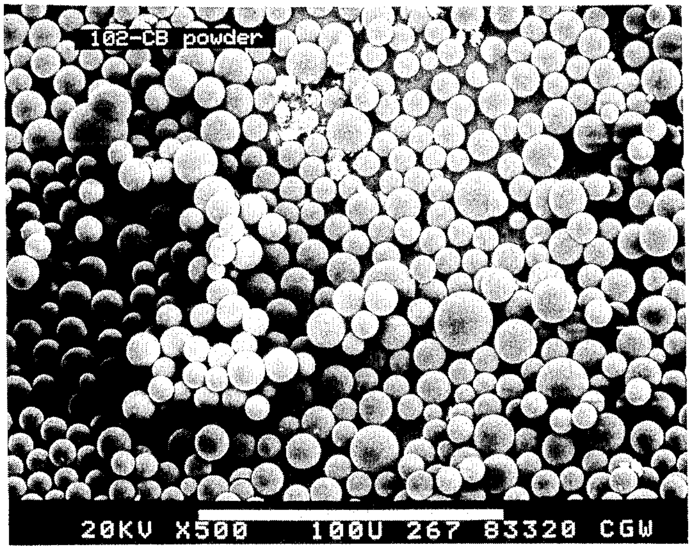
Figure 13B:
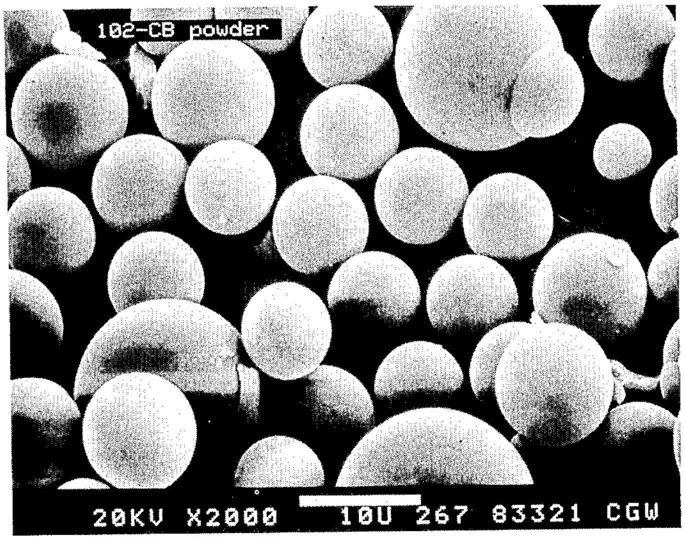
Figure 13C:
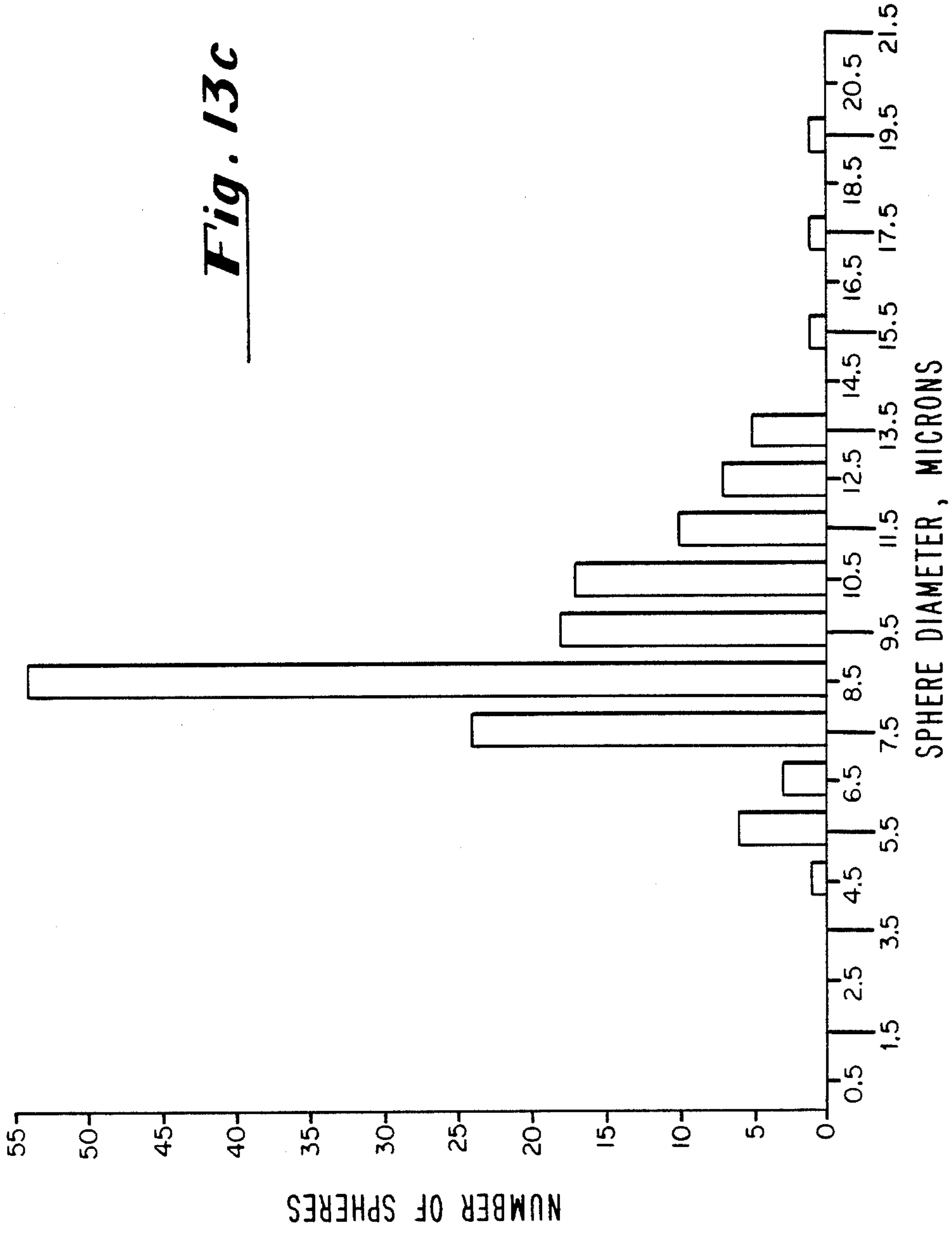
Figure 13D:
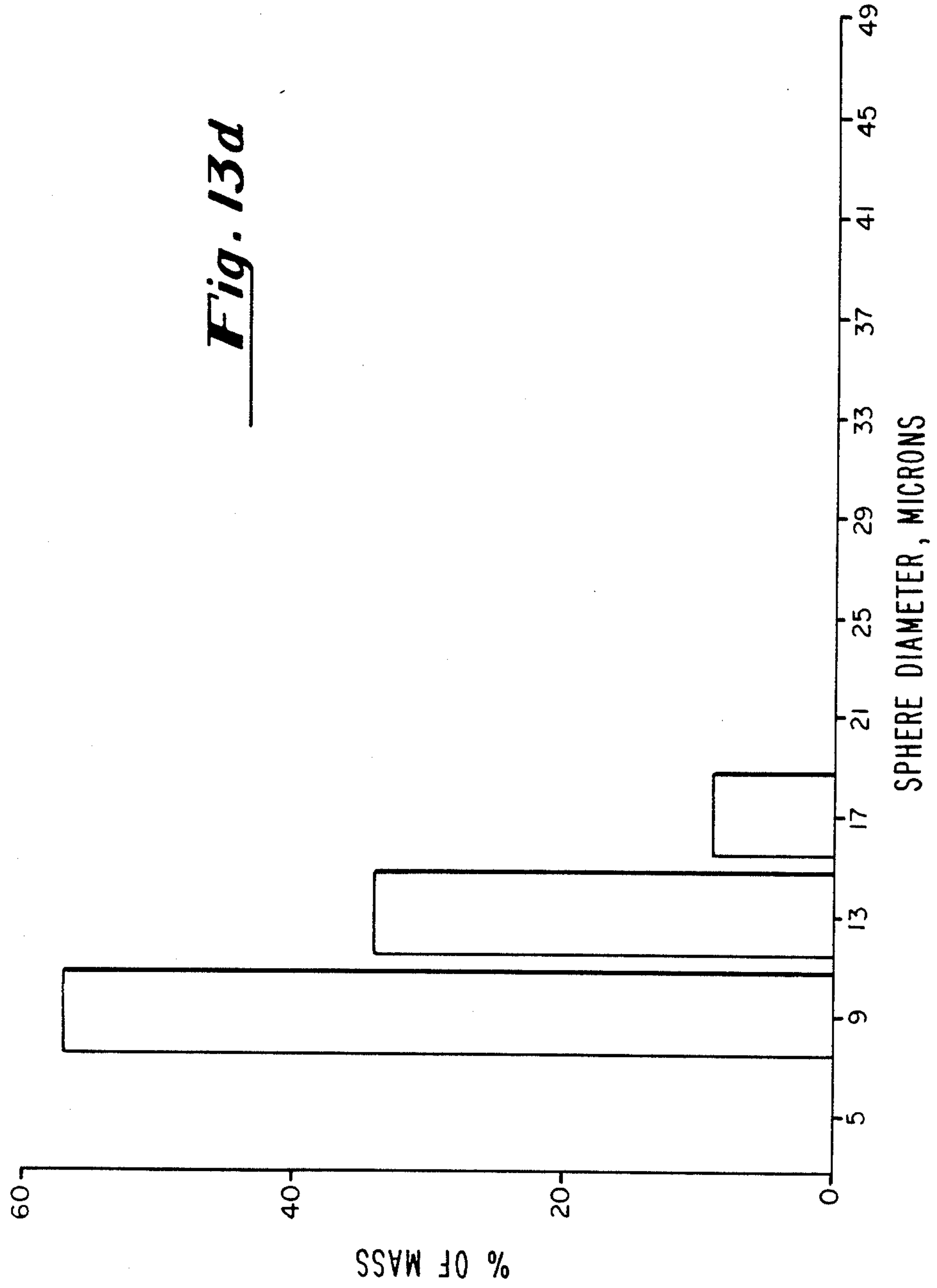

The droplets thus generated were then passed through the drying column as in previous examples and collected as dried zirconium acetate particles on a filter. The dried particles were of generally spherical shape and had a narrow size distribution as shown by the SEM of FIGS. 13*a* and 13*b*. A histogram of the size of the particles is revealed in FIG. 13*c*. FIG. 13*d* is a mass distribution histogram of the particles shown in FIG. 13*b*.

Analysis of the above example indicates that greater than about 55% of the mass of the particles is contained within the groups consisting of the group of particles having the base diameter and the group of particles having diameters that are about 1.26 times the base diameter. It will be apparent to one skilled in the art that further classification of the particles according to known means would result in a collection of particles having an even narrower size distribution. In particular, it is believed that such further classification would result in ultra narrow size distribution particles.

EXAMPLE 13

The process of Example 12 was repeated except that the zirconium acetate sol:water volume ratio was 1:10. The resulting dry particles were generally solid spheres having a narrow size distribution.

EXAMPLE 14

The process of Example 12 was repeated except that the 16 hole orifice plate was replaced by a nine hole orifice plate having a nominal orifice diameter of 7.5 microns. The largest orifice had a diameter of approximately 8 microns and the smallest orifice had a diameter of approximately 7.5 microns. The holes were arranged in square grid configuration on the plate. As in Example 11 the resultant dry particles had a narrow size distribution, although some of the particles appear to be hollow.

EXAMPLE 15

The procedure of Example 14 was repeated except that the nominal orifice size was reduced from 8 microns to 5 microns. The largest orifice had a diameter of approximately 5.5 microns and the smallest orifice had a diameter of 4 microns. The holes were arranged in a square grid configuration on the plate. Due to the small orifice size and the relatively high concentration of solid in the liquid, the apparatus would operate effectively for only about 15 seconds.

Due to the relatively high viscosity of the liquid precursor and the relatively small diameter orifices used in this example, it is believed that pressures greater than those used in this example are required to insure continuous operation for longer periods of time. However, as illustrated by Examples 1 and 2, it is believed that orifice plates having orifice diameters in the 5 to 4 micron range can be used to produce narrow size distribution droplets and particles when the pressures are somewhat higher and the viscosity of the liquid is somewhat lower than that in Example 15.

EXAMPLE 16

The process of Example 12 was repeated except that the liquid metal oxide precursor was comprised of a zirconium acetate sol diluted in distilled water in a sol:water volume ratio of 1:2.

The orifice plate was vibrated at a frequency of 465.4 KHz. The syringe pump speed was approximately $7.9\times10^{-3}$ centimeters per second, and the liquid was supplied at a pressure of between 120 and 140 psi from a 10 mL syringe. Dispersion gas was supplied to the apparatus at a pressure of about 15–18 psi and a rate of about 2.7 liters per minute. Dilution air was supplied to the apparatus at a pressure of about 15–18 psi and at a rate of about 50 liters per minute.

Figure 14A:
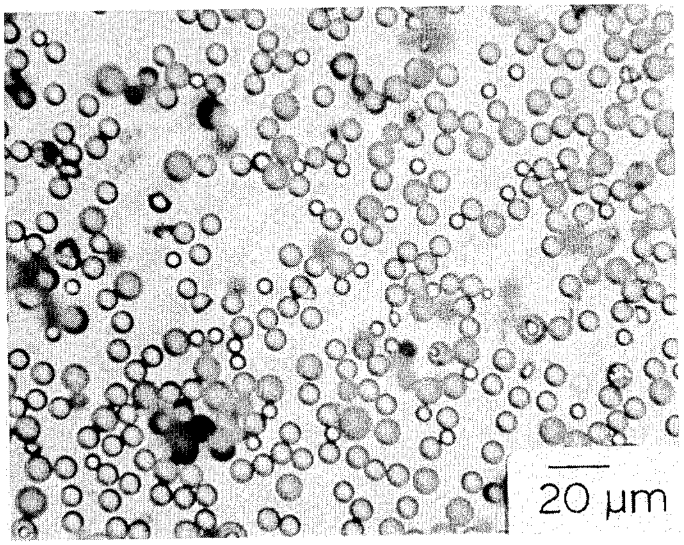
Figure 14B:
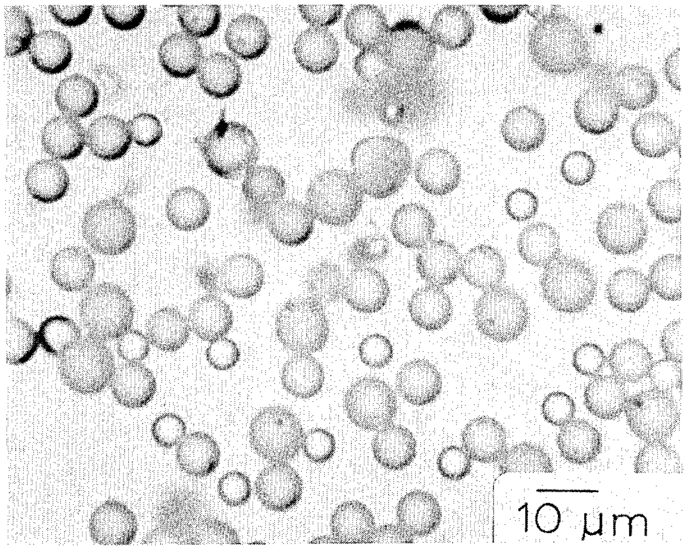

The droplets thus generated were then passed through the drying column as in previous examples and collected as dried zirconium acetate particles on a filter. The dried particles were of a generally spherical shape and had a narrow size distribution as shown by the optical micrographs of FIG. 14*a* and 14*b*. It should be noted that the particles exhibit a range of sizes greater than 4 size groups and less than about 16 size groups.

EXAMPLE 17

The process of Example 12 was repeated except that the liquid metal oxide precursor was comprised of an aluminum chlorohydrate sol diluted in distilled water in a sol:water volume ratio of 1:10. The aluminum chlorohydrate sol was comprised of the equivalent of about 23 weight percent aluminum oxide dispersed in water. The liquid precursor was supplied to the chamber at about 65 psi. The orifice plate was vibrated at a frequency of about 405 kilohertz. The syringe pump speed was approximately $5.7\times10^{-3}$ centimeters per second. Dispersion gas was supplied to the apparatus at a pressure of about 15 to 18 psi and at a rate of about 3.0 liters per minute. Dilution air was supplied to the apparatus at a pressure of about 15 to 18 psi and at a rate of about 50 liters per minute.

Figure 15:
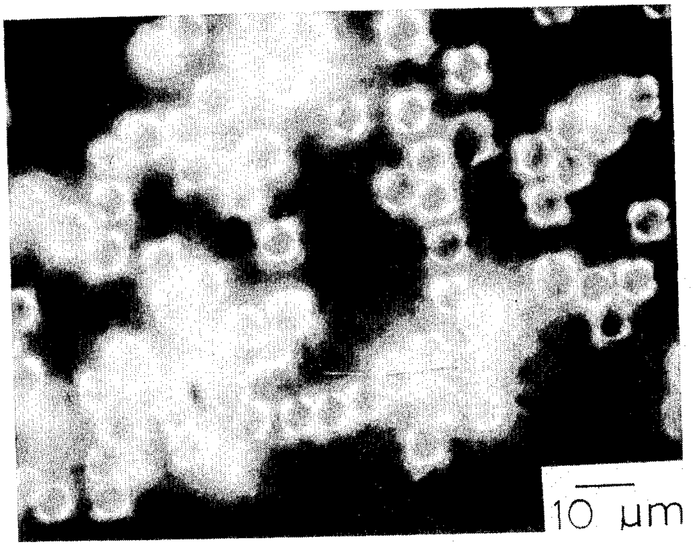

The dried particles were generally spherical in shape and had a narrow size distribution as shown by the optical micrograph of FIG. 15.

EXAMPLE 18

The procedure of Example 12 was repeated except that the 16 hole orifice plate was replaced by a 9 hole orifice plate having a nominal orifice diameter of about 7.5 microns. The largest orifice had a diameter of approximately 8 microns and the smallest orifice had a diameter of about 7.5 microns.

The liquid metal oxide precursor was comprised of a titanium containing sol supplied by Nyacol Products, Inc. The titania sol was comprised of the equivalent of about 14 weight percent titania dispersed in water. For use as a precursor in this Example, the sol was diluted in distilled water in a sol:water volume ratio of 1:10.

The orifice plate was vibrated at a frequency of about 156 kilohertz. Syringe pump speed was approximately $9.9\times10^{-3}$ centimeters per second and the liquid was supplied at a pressure of between about 40 and 50 psi. Dispersion air was supplied at a pressure of 15 to 18 psi and at a rate of about 3.5 liters per minute. Dilution air was supplied at 15 to 18 psi and at a rate of about 55 liters per minute.

Figure 16:
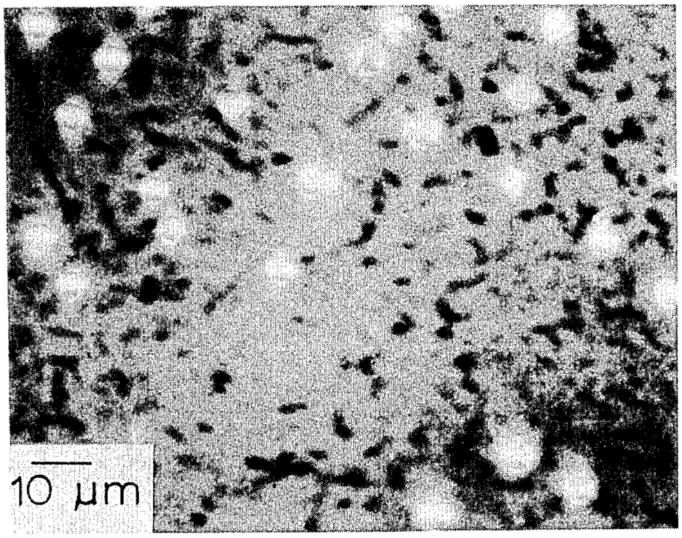

The dried particles were of a generally spherical shape and had a narrow size distribution as shown in the optical micrograph of FIG. 16.

EXAMPLE 19

The procedure of Example 18 was repeated except that the liquid metal oxide precursor was comprised of a mixture of the zirconium acetate sol utilized in Example and the aluminum chlorohydrate sol utilized in Example 17. Each sol was diluted in distilled water in a sol:water volume ratio of 1:10. The diluted sols were mixed together to produce a zirconium acetate:aluminum chlorohydrate volume ratio of about 1:2. This metal oxide precursor was supplied to the chamber at about 52 psi. The orifice plate was vibrated at a frequency of about 333 kilohertz. Syringe pump speed was about $9.9\times10^{-3}$ centimeters per second. Dispersion air was supplied at a pressure of about 15 to 18 psi and at a rate of about 3.5 liters per minute. Dilution air was supplied at a pressure of about 15 to 18 psi and at a rate of about 55 liters per minute.

Figure 17:
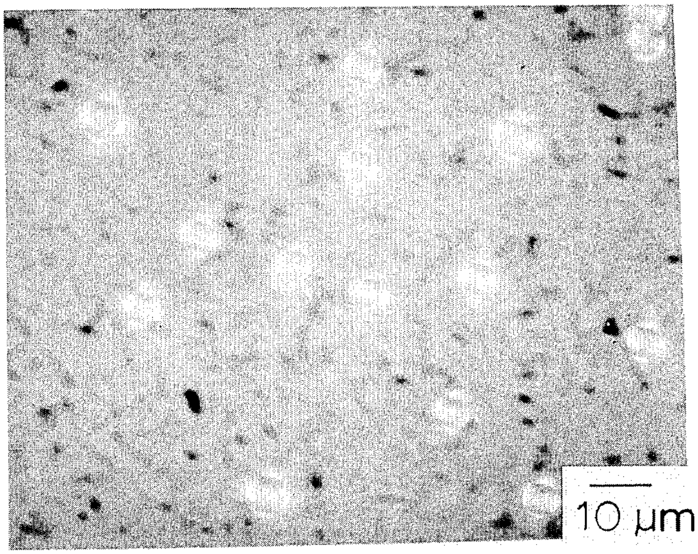

The dried particles were generally of a spherical shape and had a narrow size distribution as shown in the optical micrograph of FIG. 17. The dried particles produced by Example 19 may be calcined to produce the well known ceramic alloy alumina zirconia.

EXAMPLE 20

A prophetic example of an experiment carried out with an orifice plate configured as shown in either FIG. 3*a* or FIG. 4*a* is described below.

A droplet generator having an orifice plate with 100 orifice cells therein is provided. Each cell contains 16 orifices, each having a diameter of about 2 microns, grouped in a linear configuration (as shown in FIG. 4*a*) or in a rectangular grid (as shown in FIG. 3*a*). There is approximately 25 to 100 microns between adjacent orifices. The cells are arranged with approximately 0.4 to 1.5 millimeters between cells. A relatively thick and high strength support plate (as shown in FIG. 3*a*) or support beams (as shown in FIG. 4*a*) support the orifice plate. The orifice plate itself has a thickness of between about 5 and 300 microns.

A metal oxide precursor sol diluted in distilled water to a sol:volume ratio of about 1:20 is provided. The diluted sol is filtered and then supplied to the chamber at a pressure of about 400 to 600 psi at a rate of about 5 to 15 cc per minute. The orifice plate is vibrated at a frequency of above about 250 kilohertz. Dispersion air is supplied at a pressure of about 15 to 20 psi and at a rate of about 100 to 700 liters per minute. Dilution air is supplied at a pressure of about 15 to 20 psi and at a rate of about 160 to 1000 liters per minute.

EXAMPLE 21

Figure 2:
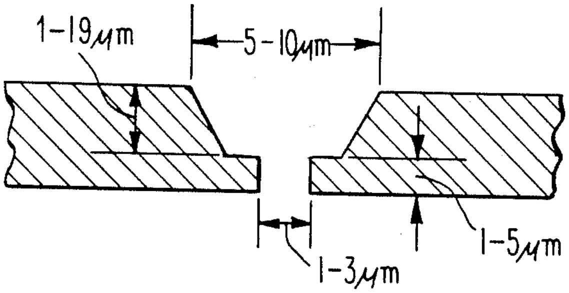
FIG. 2 is a cross sectional view of an orifice made according to one embodiment of the present invention.

A prophetic example of an experiment carried out with an orifice plate containing 6400 orifices having a nominal diameter of about 1 micron is herein disclosed. The largest orifice has a diameter no larger than about 1.5 times the diameter of the smallest orifice. The orifices are grouped in cells containing about 400 orifices per cell. The geometry of each orifice and the thickness of the plate is substantially as shown in FIG. 2.

A liquid precursor is supplied to the chamber at a pressure of between about 500 and 1500 psi and at a rate of between about 6 and 32 cc per minute. The orifice plate is vibrated at a frequency above about 250 kilohertz. Dispersion air is supplied at a pressure of between about 15 and 20 psi and at a rate of between about 20 and 800 liters per minute. Dilution air is supplied at a pressure of between about 15 and 20 psi and at a rate of between about 320 and 3200 liters per minute.

As illustrated by the examples above, the method of the present invention provides metal oxide precursor droplets and/or particles having a generally spherical shape and a narrow size distribution. As will be appreciated by those skilled in the art, however, the present invention is not limited to the production of metal oxide precursor droplets and/or particles. For example, the present invention may be successfully used to produce droplets of molten metal having a narrow size distribution; and upon cooling of these droplets, small metal particles having a narrow size distribution.

What is claimed is:

1. An apparatus for the commercial scale production of liquid droplets having a narrow size distribution comprising:

- containment means for containing a body of liquid under pressure;
- an orifice plate in communication with said containment means having a thickness of up to about 25 microns and a plurality of orifices therein, said orifices having a mean orifice diameter of up to about 20 microns and a spacing between said orifices of up to about 100 microns, the diameter of the largest orifice in said orifice plate being not greater than about three times the diameter of the smallest orifice in said orifice plate;
- means for forcing said liquid from said containment means through said orifices to produce a plurality of thin streams of liquid;
- means for vibrating said liquid streams to cause the breakup of said streams into droplets having a narrow size distribution; and
- means for converting said droplets to particles, said particles having a narrow size distribution.

2. The apparatus of claim 1 wherein each of said orifices has an opening on one side of said plate which is larger than the opening for that same orifice on the other side of the plate.

3. The apparatus of claim 1 wherein said forcing means comprises means for applying pressure to a liquid held in said containment means.

4. The apparatus of claim 3 wherein said orifice plate has at least 4 orifices therein.

5. The apparatus of claim 1 wherein said orifice plate has at least 4 orifices therein.

6. The apparatus of claim 1 wherein the diameter of the largest orifice is not greater than about two times the diameter of the smallest orifice.

7. The apparatus of claim 6 wherein the mean orifice diameter is between from about 0.5 microns to about 20 microns.

8. The apparatus of claim 7 wherein the mean orifice diameter is between from about 1 micron to about 10 microns.

9. The apparatus of claim 8 wherein the mean orifice diameter is between from about 2 microns to about 5 microns.

10. The apparatus of claim 9 wherein said orifice plate has at least nine orifices therein.

11. The apparatus of claim 9 wherein the thickness of said orifice plate is between from about 1 microns to about 25 microns.

12. The apparatus of claim 11 wherein the thickness of said orifice plate is between from about 10 microns to about 15 microns.

13. The apparatus of claim 1 wherein said orifice plate is deflected upward from the center when exposed to said pressurized liquid.

14. The apparatus of claim 1 wherein said containment means comprises means for containing a body of liquid metal oxide precursor under pressure and wherein said converting means comprises means for converting said droplets to metal oxide or metal oxide precursor particles, said particles having a mean number diameter of up to about 8.5 microns and a narrower size distribution.

15. A process for the commercial scale production of particles having a narrow size distribution said process comprising:

(a) forming a plurality of thin liquid streams by forcing said liquid under pressure through a plurality of orifices in an orifice plate having a thickness of up to about 25 microns, the mean diameter of said orifices being up to about 20 microns, the largest of said orifices in said orifice plate having a diameter which is not greater than about three times the diameter of the smallest orifice in said orifice plate and the spacing between said orifices being up to about 100 microns;

(b) vibrating said thin liquid stream to cause the breakup of said streams into liquid droplets; and (c) processing said droplets to produce particles therefrom, said particles having a narrow size distribution.

16. The process of claim 15 further comprising the step of providing a flow of dispersion gas to engage the droplets.

17. The process of claim 16 wherein said vibrating step comprises imparting a periodic vibration to said orifice plate.

18. The process of claim 16 wherein said liquid is a metal oxide precursor.

19. The process of claim 18 wherein said processing step comprises substantially removing the liquid from said droplets.

20. The process of claim 19, wherein said removing step comprises entraining said liquid droplets in a dilution gas.

21. The process of claim 20 wherein said metal oxide precursor is capable of passing through a gel phase upon removal of sufficient carrier medium.

22. The process of claim 19 wherein said metal oxide precursor comprises a sol diluted by water, said sol selected from the group consisting of:

(a) zirconium hydroxynitrate sols;

(b) zirconium acetate sols;

(c) mixtures of aluminum chlorohydrate sols and zirconium hydroxynitrate sols;

(d) aluminum chlorohydrate sols; and (e) mixtures of aluminum chlorohydrate sols and zirconium acetate sols.

23. The process of claim 19 wherein said metal oxide precursor comprises a titanium containing sol diluted by water.

24. The process of claim 15 wherein said processing step comprises processing said droplets to produce particles thereform, said particles having a narrow size distribution and a mean number diameter of up to about 5 microns.

25. The process of claim 24 wherein said particles are dry, solid particles.

26. The process of claim 15 wherein said forcing step comprises forcing said liquid under a pressure sufficient to cause deflection of said orifice plate upward from the center such that said liquid streams diverge from one another.

27. The process of claim 15 wherein said liquid comprises liquid metal oxide precursor and wherein said processing step comprises processing said droplets to produce metal oxide or metal oxide precursor particles therefrom, said particles having a narrow side distribution and a mean number diameter of up to about 8.5 microns.

28. The process of claim 15 wherein said forming step comprises forming a plurality of thin liquid streams by forcing said liquid under a pressure of at least about 36 pounds per square inch.

29. The process of claim 15 wherein the liquid in said liquid streams moves in a generally upward direction as it exits said orifice plate.

* * * * *

UNITED STATES PATENT AND TRADEMARK OFFICE

CERTIFICATE OF CORRECTION

PATENT NO. : 4,871,489

DATED : October 3, 1989

INVENTOR(S) : Thomas D. Ketcham

It is certified that error appears in the above-identified patent and that said Letters Patent is hereby corrected as shown below:

Col. 4, line 9, "an" should read "and"

Col. 9, line 68, "$1x10^{313}$" should read "$1x10^{-3}$"

Col. 15, line 18, should read "Example 12"

Col. 17, line 37, "stream" should read "streams"

Signed and Sealed this

Twenty-fifth Day of August, 1992

*Attest:*

DOUGLAS B. COMER

*Attesting Officer*

*Acting Commissioner of Patents and Trademarks*